United States Patent [19]

Watanabe

[11] Patent Number: 5,277,816
[45] Date of Patent: Jan. 11, 1994

[54] PROCESS FOR PRODUCING TITANIUM DIOXIDE
[75] Inventor: Morio Watanabe, Hyogo, Japan
[73] Assignee: Solex Research Corporation of Japan, Tokyo, Japan
[21] Appl. No.: 756,481
[22] Filed: Sep. 9, 1991
[30] Foreign Application Priority Data
  Sep. 12, 1990 [JP] Japan .................................. 2-239933
[51] Int. Cl.⁵ ............................................ B01D 11/04
[52] U.S. Cl. ..................................... 210/634; 423/70
[58] Field of Search .................. 423/70, 610; 210/634, 210/511

[56]       References Cited
       U.S. PATENT DOCUMENTS
  4,082,832  4/1978  Watanabe et al. ..................... 423/70
  5,061,460  10/1991 Watanabe et al. ............... 423/610 X FOREIGN PATENT DOCUMENTS
  0090692  10/1983  European Pat. Off. .
  0207403  1/1987   European Pat. Off. .
  0273244  7/1988   European Pat. Off. .
  0298763  1/1989   European Pat. Off. .

Primary Examiner—Frank Spear
Attorney, Agent, or Firm—McAulay Fisher Nissen Goldberg & Kiel

[57]              ABSTRACT

A process for producing titanium dioxide which discharges no waste is disclosed. In a first step, a sulfuric acid solution containing titanium ion with one or more kinds of metal ions is contacted with a first organic solvent to extract the titanium ion as a sulfuric acid complex. The organic solvent containing the extracted titanium as a sulfuric acid complex (titanyl sulfate) is contacted with an aqueous liquid to strip the titanium into the aqueous liquid and regenerate the first organic solvent. In a second step, the aqueous liquid containing the titanium is subjected to hydrolysis to form insoluble titanium hydroxide, and the titanium hydroxide is washed with dilute sulfuric acid and/or clear water. In a third step, the raffinate of extraction in the first step is contacted with a second organic solvent to extract the titanium ion and the organic solvent containing extracted titanium is contacted with water, dilute sulfuric acid solution or a dilute titanyl sulfate solution to strip the titanium, and regenerate the organic solvent.

19 Claims, 9 Drawing Sheets

PROCESS FOR PRODUCING TITANIUM DIOXIDE

BACKGROUND OF THE INVENTION

1. Field of the Invention

The present invention relates to a sulfuric acid process for producing titanium dioxide, which discharges no industrial waste.

2. Related Background Art

In a production of titanium dioxide by a conventional sulfuric acid process, a titanium-iron containing substance like a titanium-iron ore (e.g., ilumenite and anatase) or titanium slag is reacted with sulfuric acid at an elevated temperature to produce a titanyl-sulfate-containing solid product composed mainly of titanyl sulfate, ferrous sulfate and ferric sulfate, and additionally of magnesium sulfate, manganese sulfate, chromium sulfate, vanadium sulfate, aluminum sulfate, sulfates of other elements, and unreacted substances. The sulfated solid product is dissolved in water, dilute sulfuric acid or a sulfate-salt-containing solution. In the dissolution, the molar ratio of sulfuric acid to titanium dioxide (hereinafter the ratio being referred to as an "acid value") have to be controlled to be not higher than 2.3 in order to precipitate the titanium ion in the solution by hydrolysis as insoluble titanium hydroxide. Accordingly, the concentration of the free sulfuric acid to promote dissolution of the solid reaction product cannot be raised unlimitedly. Further in the process, in order to reduce the amount of iron co-precipitated by hydrolysis, a reducing agent such as iron scrap is added to the solution to convert ferric sulfate therein to ferrous sulfate. After the reduction, crystalline ferrous sulfate ($FeSO_4 \cdot 7H_2O$) is deposited by cooling the solution to decrease the iron content in the solution and to produce a titanium-iron solution containing titanyl sulfate and variety of metal ions.

In conventional processes, the sulfate solution containing mainly titanyl-iron sulfate is added to a boiling dilute titanyl sulfate solution. Seeds for promoting the formation of titanium hydroxide and then boiling water are added to form insoluble titanium hydroxide. The resulting titanium hydroxide is separated from the liquid by filtration.

The separated titanium hydroxide, which contains adsorbed hydroxides of iron, manganese, vanadium, chromium, etc. contained in the raw material, is carefully rinsed repeatedly with a dilute sulfuric acid solution to remove other coexisting metals, and is subsequently rinsed by water to remove the adhered sulfuric acid. The titanium hydroxide is dehydrated and oxidized at an elevated temperature to give titanium dioxide.

This conventional process is disadvantageous in that the yield of the insoluble titanium hydroxide by hydrolysis is approximately from 94% to 95%, and the rest of the titanium is discarded as $TiO_2$ at a concentration of from about 6 to about 9 g/l in the solution after the hydrolysis. The process is also disadvantageous in that minute amounts of scarce metals contained in the raw material such as titanium-iron ore and titanium slag are naturally not recovered and are discarded with the waste sulfuric acid after the hydrolysis. Even when the waste sulfuric acid is neutralized, the titanium dioxide and other metals in the waste sulfuric acid are similarly disadvantageously discarded. Further, titanium dioxide as well as other metals contained in the dilute sulfuric acid used for rinsing of the insoluble titanium hydroxide cannot be recovered efficiently and economically. Therefore such a dilute sulfuric acid solution is discarded without being recovered since evaporation concentration thereof is costly, which causes global oceanic pollution.

If the waste acid and the formed acid washing solution or water washing solution used for the titanium hydroxide is neutralized by use of calcium hydroxide which is an inexpensive alkali, it disadvantageously produces wet gypsum in an amount of 20 to 25 tons per ton of produced titanium dioxide, which costs a great deal in treating the large amount of the waste and creates difficulty in finding a site for discarding it. Accordingly, the sulfuric acid process for manufacturing titanium dioxide, which produces a large amount of waste, has been destined to decline in spite of its many advantages.

Improvements of the conventional methods for extracting titanyl sulfate from a sulfuric acid solution thereof are disclosed in U.S. Pat. Nos. 4,499,058 and 4,734,271.

In the method disclosed in U.S. Pat. No. 4,499,058, insoluble titanium hydroxide is once formed from titanyl-iron sulfate solution by a conventional hydrolysis; the resulting titanium hydroxide is separated by filtration; the filtrate after the hydrolysis is concentrated by evaporation to a concentration of total sulfuric acid concentration of than 500 g/l or more; and subsequently, most of the sulfuric acid and the titanyl sulfate in the aqueous solution is extracted by use of phosphorus type organic solvent. As a result, the titanium dioxide is recovered and the cost for treating the waste sulfuric acid is reduced. This method, however, has many disadvantages as listed below which prevents the commercialization of the method.

(1) The sulfuric acid having been extracted for the purpose of reducing the neutralization cost is stripped and transferred into a aqueous solution in the subsequent stripping stage, giving a high molar ratio of titanium dioxide to sulfuric acid (referred to as an "acid value" in this specification) in the recovered titanyl sulfate-containing solution, which prevents formation of insoluble titanium hydroxide by hydrolysis.

(2) The need for a large amount of extracting agent to combine with the sulfuric acid to be extracted necessitates use of a large amount of organic solvent and a large amount of circulating organic solvent, which results in a heavy equipment investment.

(3) The need for a high concentration of the phosphorus type extracting agent in the organic solution results in a high viscosity of the organic solvent, and the evaporation-concentrated waste sulfuric acid having a concentration of 500 g/l or more is in a state of viscous syrup, so that the extraction apparatus have to be operated at a heated state.

(4) A large amount of water is used for regeneration of the organic solvent owing to a large amount of sulfuric acid extracted together with titanyl sulfate, recovering a dilute titanyl sulfate solution which cannot be utilized further in view of water balance.

(5) Metals other than titanium, such as zinc, niobium, chromium, vanadium, aluminum, magnesium, manganese, and iron, cannot be economically recovered from the waste sulfuric acid solution after formation of insoluble titanium hydroxide, so that the amount of wasted matter cannot be reduced.

(6) The dilute sulfuric acid-rinsing solution and the rinsing water obtained after rinsing of the insoluble titanium hydroxide formed by hydrolysis is not reusable, which prevents the reduction of neutralization cost and concentration cost.

In the method disclosed in the aforementioned U.S. Pat. No. 4,734,271, a sulfated starting material is dissolved in a sulfate salt-containing solution; iron scrap is added thereto to convert contained ferric sulfate to ferrous sulfate; the titanyl sulfate is extracted with a phosphorous type extracting agent from the sulfuric acid solution to separate other coexisting metal ions; subsequently iron is removed therefrom; and the titanyl sulfate is hydrolyzed. This method involves the same problems as the method of U.S. Pat. No. 4,499,058 in that the region of extraction of titanyl sulfate is large, and the amount of co-extracted sulfuric acid is large, and separately concentrated sulfuric acid is required additionally. In the former patent, the solution to be treated is firstly concentrated to raise the total sulfuric acid concentration and subsequently treated for extraction, while in the latter patent, separately concentrated sulfuric acid is brought into contact with the circulating organic solvent prior to and midway through the extraction of the titanyl sulfate, and the concentration is conducted with the solution after hydrolysis which is the same as in U.S. Pat. No. 4,499,058.

Moreover, the method disclosed in U.S. Pat. No. 4,734,271 is disadvantageous for the following reasons.

(i) The sulfuric acid concentration in the treated solution decreases as the extraction of titanyl sulfate proceeds, which will hinder the extraction of the titanyl sulfate. To compensate for this, the organic solvent has to be brought into contact a number of times with a 40-90% sulfuric acid solution, which renders the process complicated.

(ii) The molar ratio of the titanium oxide to be extracted into the organic solvent to the sulfuric acid is controlled by an aqueous solution brought into contact in a stripping stage, which requires skill in process operation, as well as careful control of concentrations of titanium dioxide and sulfuric acid of the washing solution.

(iii) With the decrease of the titanium concentration in the treated solution, the amount of extracted impurity metal ions increases. Therefore, the impurity metal ion concentration in the treating solution cannot be raised, in order to conduct extraction of the titanyl sulfate completely.

(iv) With the decrease of the titanium concentration in the treated solution, the amount of co-extracted sulfuric acid will remarkably increase, and a large amount of washing solution is required for removing the co-extracted sulfuric acid. Therefore, the concentration of the impurity metal ions in the solution after the extraction cannot be raised, in order to conduct extraction of the titanyl sulfate completely.

(v) With the progress of the extraction of titanyl sulfate, the sulfuric acid concentration in the treated solution decreases, which causes crystallization of ferrous sulfate ($FeSO_4 \cdot 7H_2O$) in the apparatus. Therefore, a crystallization apparatus for the ferrous sulfate has to be equipped in the extraction apparatus, which render the extraction apparatus complicated.

(vi) The titanium ion remaining in the solution after the hydrolysis is not directly recoverable, which then requires the same concentration treatment as described in the U.S. Pat. No. 4,499,058.

(vii) In conducting the titanium recovery operation described in above Item (vi), the contact of circulating organic solvent with sulfuric acid may cause contamination of titanium by a colored metal ion, such as, of chromium, vanadium, manganese, and iron.

(viii) The method does not allow to recover economically all the metals other than titanium contained in the starting material, so that the discharge of noxious industrial waste cannot completely be prevented.

SUMMARY OF THE INVENTION

The present invention intends to provide an improved method for producing titanium dioxide by a sulfuric acid process, which is free from the aforementioned disadvantages involved in the prior art.

The present invention provides a process for producing titanium dioxide which does not discharge a waste, the process comprising a first, a second, and a third step in combination:

the first step comprising bringing a sulfuric acid solution containing titanium ion together with one or more kinds of metal ions into contact with an organic solvent A composed of one or more extractants selected from the group consisting of oxygen-containing extractants and alkylamine extractants and a petroleum hydrocarbon diluent to extract the titanium ion as a sulfuric acid complex (titanyl sulfate) from the sulfuric acid solution; and bringing the organic solvent A containing the extracted titanium in a form of a sulfuric acid complex into contact with an aqueous liquid having been employed for rinsing insoluble titanium hydroxide formed in the second step and/or an aqueous liquid having been employed for stripping in the third step to strip the titanium in a form of sulfuric acid complex into the aqueous liquid and to regenerate the organic solvent A for recycling for extraction, the second step of treating the aqueous liquid containing the titanium in a form of sulfuric acid complex stripped from the organic solvent A for hydrolysis to form insoluble titanium hydroxide; and washing the titanium hydroxide with dilute sulfuric acid and or clear water, and the third step of bringing a part or whole of the raffinate of extraction in the first step into contact with an organic solvent B composed of an extractant selected from the group consisting of oxygen-containing extractants and alkylamine extractants and a petroleum hydrocarbon diluent to extract the titanium ion as a sulfuric acid complex from the raffinate; and bringing the organic solvent B containing extracted titanium in a form of sulfuric acid complex into contact with water, dilute sulfuric acid solution or a dilute titanyl sulfate solution to strip the titanium in a form of sulfuric acid complex to regenerate the organic solvent B for recycling to extraction.

DETAILED DESCRIPTION OF THE PREFERRED EMBODIMENT

Figure 1:
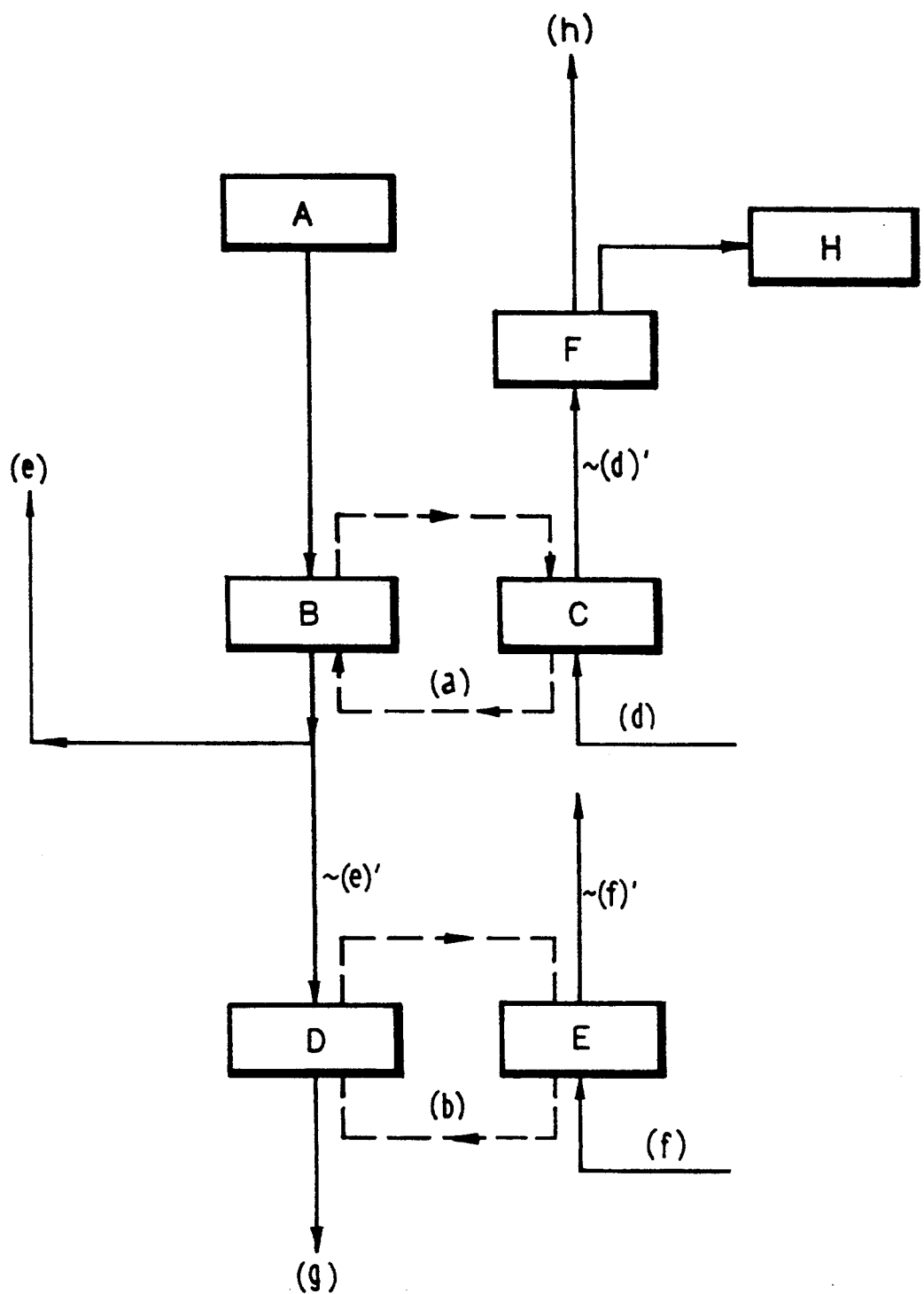
FIG. 1 is a flow sheet illustrating a basic type of the present invention.

The disadvantages of the prior art can be overcome by combining systematically the three steps of the process described in the above Summary of the Present Invention to produce titanium dioxide, by which a high concentration of sulfate salt solution that allows economical recovery of various metals coexisting with titanium ion is derived and simultaneously insoluble titanium hydroxide is produced in high purity, and calcining the resulting titanium hydroxide into titanium dioxide.

Furthermore, combination of a fourth step with the above three steps enables constitution of a closed system which does not discharge waste acid.

In the first step of the process, titanium-iron ore (ilumenite and anatase), titanium slag, or titanium-containing industrial waste is treated with sulfuric acid to prepare a solid sulfation reaction product. The solid product is dissolved in a sulfate-containing solution. The resulting sulfuric acid solution is cooled to remove the iron ion as crystalline ferrous sulfate ($FeSO_4 \cdot 7H_2O$). Subsequently the titanium is extracted from the sulfuric acid solution in a form of a sulfuric acid complex by bringing the sulfuric acid solution into contact with an organic solvent A composed of one or more extractants selected from the group consisting of oxygen-containing extractants and alkylamine extractants and a petroleum hydrocarbon diluent. Subsequently, the organic solvent A containing the extracted titanium in a form of a sulfuric acid complex is brought into contact with the rinsing liquid having been employed for rinsing the insoluble titanium hydroxide formed in the second step and/or a stripping liquid employed for stripping in the third step and the fourth step to strip (or inversely extract) the titanium sulfuric acid complex from the organic solvent A to the aqueous solution and to regenerate the organic solvent A to be recycled for extraction.

In the second step of the process, the aqueous solution containing the titanium sulfuric acid complex stripped from the organic solvent A is introduced to the hydrolysis stage to form insoluble titanium hydroxide according to a known hydrolysis method. The resulting insoluble titanium hydroxide is separated by filtration and is rinsed with dilute sulfuric acid and/or water.

The raffinate of the extraction of the first step, which contains variety of metal ions in addition to the titanium ion, is recycled to the stage where a raw material such as titanium-iron ore and titanium slag, and 85-95% sulfuric acid are reacted at an elevated temperature of from 150° to 250° C. and aged for a sufficient time, the resulting sulfation product being dissolved in order to raise the concentration of titanium as well as of other metals such as iron, manganese, chromium, vanadium, niobium, zirconium, aluminum, magnesium, zinc, nickel, and cobalt for the purpose of recovering the metals economically. When the concentration of the metal ions in the extraction raffinate has become sufficiently high, a portion thereof is introduced to the third step of the process.

In the third step of the process, the introduced raffinate is brought into contact with an organic solvent B composed of an extractant selected from the group consisting of oxygen-containing extractants and alkylamine extractants and a petroleum hydrocarbon diluent to extract the titanium ion as a sulfuric acid complex from the raffinate into the organic solvent B. Subsequently, the organic solvent B containing extracted titanium in the form of sulfuric acid complex is brought into contact with water, dilute sulfuric acid solution and/or the rinsing liquid having used for rinsing the insoluble titanium hydroxide to strip the titanium as a sulfuric acid complex and to regenerate the organic solvent B to be recycled for extraction.

By combining the above described three steps of the process, a metal sulfate-containing solution is derived which contains metals other than titanium at concentrations sufficient for economical recovery thereof from titanium-iron ore, titanium slag, and/or titanium-containing industrial waste. Titanium dioxide is produced by calcining the insoluble titanium hydroxide derived in the second step. Thus the disadvantages of the prior art are cancelled.

In the fourth step of the process, the hydrolyzed solution from which insoluble titanium hydroxide has been separated is brought into contact with an organic solvent C composed of an extractant selected from the group consisting of oxygen-containing extractants and alkylamine extractants and a petroleum hydrocarbon diluent to extract the titanium ion as a sulfuric acid complex from the raffinate into the organic solvent C. Subsequently, the organic solvent C containing extracted titanium in the form of sulfuric acid complex is brought into contact with water, dilute sulfuric acid solution and/or the rinsing liquid having used for rinsing the insoluble titanium hydroxide to strip the titanium as a sulfuric acid complex into the aqueous solution and to regenerate the organic solvent C.

The raffinate of extraction in the fourth step is treated for evaporation concentration according to a conventional method to increase the concentration of sulfuric acid, and is recycled for sulfation of a starting material such as titanium-iron ore, titanium slag, titanium-containing industrial waste. The amount of the recovery of sulfuric acid is thus increased, so that the consumption of the sulfuric acid is decreased to 1/10 or less in comparison with conventional methods.

By the combination of the above four steps of the process for producing titanium dioxide, the titanium, the sulfuric acid, and the washing solution are all reusable.

In another process of the present invention, at least one of chlorine compounds of hydrogen, sodium, ammonium, magnesium, potassium, iron, and titanium is added to the raffinate of extraction of the first step. The mixture is introduced to the third step and is brought into contact with the organic solvent B composed of one or more extractants selected from the group consisting of oxygen-containing extractants and alkylamine extractants and a petroleum hydrocarbon diluent to extract the titanium ion as a chloride complex and a sulfuric acid complex from the extraction raffinate; and the organic solvent B is brought into contact with a titanyl sulfate-containing solution or the extraction raffinate of the first step before the chloride mixing to selectively strip the chloride complex and the chloride ion selectively into the aqueous solution, and the organic solvent B is further brought into contact with water, dilute sulfuric acid solution and/or a rinsing solution having been used for rinsing insoluble titanium hydroxide formed in the second step in order to strip the titanium-sulfuric acid complex from the organic solvent B into the aqueous solution and to regenerate the organic solvent B.

The stripping solutions containing titanyl sulfate derived in the third step and the fourth step are introduced to the scrubbing stage of the first step and are brought into contact with the organic solvent A to selectively remove impurity metal ions co-extracted with the titanium-sulfuric acid complex from the organic solvent A, giving a high purity of the insoluble titanium hydroxide in the second step. This titanium hydroxide is calcined into titanium dioxide. Thus the disadvantages of the prior art are cancelled.

In still another process, the stripping solutions containing titanyl sulfate derived in the third step and the fourth step are introduced to the stripping stage of the first step, and are brought into contact with the organic solvent A to strip the titanium-sulfuric acid complex from the organic solvent A to the aqueous solution and to regenerate the organic solvent A. The titanium-sulfuric acid complex stripped as above from the organic solvent A to the aqueous solution is introduced to the second step and hydrolyzed into insoluble titanium hydroxide, which is separated by filtration and rinsed with dilute sulfuric acid and/or water, and then calcined into titanium dioxide. Thus the disadvantages of the prior art are cancelled.

Further, the raffinate of extraction of the third step is introduced into a chamber of a membrane separation apparatus having chambers partitioned by an anion-selective dialysis membrane with introduction of clear water into another chamber to recover free sulfuric acid by utilizing the difference of sulfuric acid concentration in between the two chambers. The recovered sulfuric acid is recycled to a suitable stage in the first to fourth steps or the evaporation-concentration stage of the fourth step. Thereby the required amount of the sulfuric acid for production of titanium dioxide is further reduced.

In the production method of the present invention, the amount of the discharged waste sulfuric acid is decreased to 1/20 to 1/50 times that of the conventional method, and furthermore the sulfuric acid containing valuable nonferrous metals which are useful as a raw material of the metals, and may particularly be important as a source for scarce metals.

As described above, the present invention provides a process for producing titanium dioxide by a sulfuric acid process which does not discharge waste and is economical by improving conventional sulfuric acid processes which discharge large amounts of industrial waste.

The raw material in the present invention is not limited at all, and includes a variety of materials such as naturally occurring titanium-iron ore (ilumenite and anatase), artificial titanium concentrate such as titanium slag, industrial wastes containing a large amount of coexisting metals other than titanium, and the like.

In conventional processes for titanium dioxide production, a starting material is pulverized into fine powder and mixed and stirred with concentrated sulfuric acid to allow temperature rise and aging. The material is then dissolved in a sulfate-salt-containing solution in a leaching stage. In the dissolution in conventional processes, the ratio of the titanium dioxide and the sulfuric acid have to be carefully adjusted so as to give the acid value suitable for formation of insoluble titanium hydroxide by hydrolysis.

In the titanium dioxide production of the present invention, however, the titanium concentration as well as ion concentrations of metals other than titanium, and the acid value need not be adjusted. Furthermore, in conventional processes, ferric sulfate in the solution has to be reduced to ferrous sulfate by addition of iron scrap or the like, while in the present invention the ferric sulfate is not necessarily required to be reduced to ferrous sulfate.

Further, the raffinate of extraction in the first step is mostly recycled for use for dissolving the raw material, so that the solution of the raw material comes to contain considerably high concentrations of ions of manganese, vanadium, chromium, aluminum, magnesium, zirconium, niobium, zinc and iron which are contained in the raw material. The iron ion, which can be removed by cooling the sulfuric acid solution as crystalline ferrous sulfate ($FeSO_4 \cdot 7H_2O$), may be lowered to an iron concentration level corresponding to the cooling temperature, while the other metal ions can be concentrated to levels of 20 to 50 times that of the solution derived in conventional methods. Accordingly, the solution can be a valuable source of metals. Thus the present invention provides a titanium production process which does not discharge generally considered industrial waste.

Furthermore, the scarce metals contained in minute amounts in the raw materials are expensive, so that the recovery of the valuable metals serves to greatly reduce the production cost of titanium dioxide.

The object of the present invention is achieved by utilization of the characteristics of two kinds of organic solvents A and B, or three kinds of organic solvents A, B, and C. U.S. Pat. Nos. 4,499,058 and 4,734,271, noticing the considerable change of state of titanium-containing sulfuric acid solution during the production of titanium dioxide by sulfuric acid, disclose selective use of organic solvents having characteristics suitable for the state of the treated solution and the object of the treatment, where one kind of organic solvent is employed and the treated solution is adjusted to meet the characteristics of the organic solvent used: for example, the treated solution is concentrated or the treated solution is brought into contact with 40%–90% sulfuric acid solution before extraction or between extraction stages.

On the contrary in the present invention, the state of a treated solution is not changed, but a suitable organic solvent is provided by employing one or more extractants selected from the group of oxygen-containing extractants and alkylamine extractants, and a petroleum hydrocarbon diluent. The concentration of the extractant in the solvent is decided by testing innumerable extractants individually so as to undergo the reactions shown by the formulas (1) to (17).

The extracting organic solvent employed in the extraction stage of the first step required to be chemically stable because it is brought into contact with a high concentration of sulfuric acid, and is additionally required to be suitable for the reactions shown below. (In the formulas, the symbol "Org" denotes an extractant molecule, and the symbol "Me" denotes a metal other than titanium.)

$$TiOSO_4 + H_2SO_4 + MeSO_4 + Org \rightarrow TiOSO_4.Org + MeSO_4 + H_2SO_4 \quad (1)$$

$$TiOSO_4 + H_2SO_4 + MeSO_4 + 2Org \rightarrow H_2TiO(SO_4)_2.2Org + MeSO_4 \quad (2)$$

$$TiOSO_4 + H_2SO_4 + MeSO_4 + Org \rightarrow H_2SO_4.Org + TiOSO_4 + MeSO_4 \quad (3)$$

$$TiOSO_4 + H_2SO_4 + MeSO_4 + H_2SO_4.Org \rightarrow TiOSO_4.Org + 2H_2SO_4 + MeSO_4 \quad (4)$$

$$TiOSO_4 + H_2SO_4 + MeSO_4 + H_2TiO(SO_4)_2.2Org \rightarrow 2TiOSO_4.Org + 2H_2SO_4 + MeSO_4 \quad (5)$$

In the extraction stage of the first step, the organic solvent is required to have ability of selectively separating $TiOSO_4$ from an aqueous solution at high concentrations of $MeSO_4$ and $H_2SO_4$.

At the extraction stage of the third step, the organic solvent is required to be suitable for the reactions below.

$$TiOCl_2 + TiOSO_4 + H_2SO_4 + MeSO_4 + 2Org \rightarrow TiOCl_2.Org + TiOSO_4.Org + H_2SO_4 + MeSO_4 \quad (6)$$

$$TiOSO_4 + MeCl_2 + H_2SO_4 + MeSO_4 + Org \rightarrow TiOCl_2.Org + MeSO_4 + 2HCl + H_2SO_4 \quad (7)$$

At the extraction stage of the third step, the concentration of $H_2SO_4$ is slightly lower and the concentration of $TiOSO_4$ itself is also lower. As the extraction of $TiOSO_4$ proceeds, the concentration of $H_2SO_4$ decreases, which causes deposition of $FeSO_4 \cdot 7H_2O$ as described in U.S. Pat. No. 4,734,271, which suppresses the reaction of the formulas (2) and (3). Accordingly, the organic solvent is required to be suitable for the extraction according to the formulas (8) to (11).

$$MeCl_2.Org + TiOSO_4 + 2H_2SO_4 \rightarrow H_2TiO(SO_4)_2.Org + MeSO_4 + 2HCl \quad (8)$$

$$MeCl_2.Org + TiOSO_4 + H_2SO_4 \rightarrow TiOSO_4.Org + MeCl_2 + H_2SO_4 \quad (9)$$

$$TiOCl_2.Org + H_2SO_4 \rightarrow TiOSO_4.Org + 2HCl \quad (10)$$

$$H_2TiO(SO_4)_2.2Org + MeCl_2 \rightarrow 2TiOSO_4.Org + MeSO_4 + 2HCl \quad (11)$$

For stripping the extracted $TiOSO_4$ from the organic solvent, the reactions of the formulas (12) to (15) need to proceed.

$$2TiOSO_4.Org + dil.H_2SO_4 \rightarrow TiOSO_4 + TiSO_4.Org + H_2SO_4 \quad (12)$$

$$2TiOSO_4.Org + dil.H_2SO_4 \rightarrow 2TiOSO_4 + H_2SO_4.Org + Org \quad (13)$$

$$2H_2TiO(SO_4)_2.Org + Water \rightarrow 2TiOSO_4 + 2H_2SO_4.Org \quad (14)$$

$$TiOSO_4.Org + Water \rightarrow TiOSO_4 + Org \quad (15)$$

In the washing stages of the first step and the third step, the reactions of the formulas (16) and (17) need to proceed.

$$MeSO_4.Org + TiOSO_4 \rightarrow TiOSO_4.Org + MeSO_4 \quad (16)$$

$$H_2SO_4.Org + TiOSO_4 \rightarrow TiOSO_4.Org + H_2SO_4 \quad (17)$$

The present invention utilizes, in two or more stages, the above characteristics suitable for the extraction reactions to produce titanium dioxide in high purity from titanium-iron ore, titanium slag, and/or a titanium-containing industrial waste.

The extraction characteristics and stripping characteristics shown by the formulas (1) to (17) cannot be achieved economicaly by use of a single extractant.

The present invention utilizes, as the result of study on the properties of extractants, synergistic effect of two or more extractants in mixture to achieve a considerable economical advantage. Further, the present invention avoids the difficulty of treating the change of extraction conditions corresponding to the change of the chemical composition of the treated solution at one extraction stage in conventional processes.

As described above, the present invention provides a process for producing titanium dioxide which cancels all the disadvantages of the conventional processes, enabling economical recovery of all metals contained in raw materials without discharging industrial waste.

The oxygen-containing extractant in the present invention is selected from the group below:

(a) Amides:

$$R-\underset{\underset{O}{\|}}{C}-NH_2, \quad R-\underset{\underset{R'}{|}}{N}-\underset{\underset{O}{\|}}{C}-CH_3, \text{ and}$$

-continued

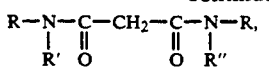

wherein R, R', and R" represent respectively an alkyl radical or an aryl radical having 4 to 22 carbons, including cases where R=R'=R", R=R'≠R", or R≠R'≠R", or alkyl and aryl radicals are mixedly employed.

(b) Ketones:

Either an aliphatic ketone or an aromatic ketone may be employed. Either a simple ketone or a mixed ketone may be employed. In the formula, R and R' represent an alkyl radical or an aryl radical having 8 to 24 carbons.

(c) Alcohols:

Primary, secondary, and tertiary alcohol having 8 to 18 carbon atoms.

(d) Esters:

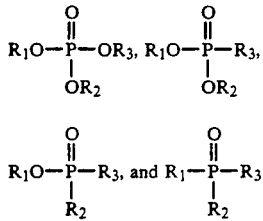

wherein $R_1$, $R_2$, and $R_3$ represent alkyl radicals and aryl radicals having 4 to 18 carbons, including cases where the alkyl radicals or the aryl radicals differ from each other or alkyl and aryl radicals are mixedly employed, namely the cases of $R_1=R_2=R_3$, $R_1=R_2\neq R_3$, or $R_1\neq R_2\neq R_3$.

The alkyl amines and alkyl aryl amines employed in the present invention are selected from the groups below:

(a) Primary amines:

A primary amine represented by $RNH_2$ where R is an alkyl or aryl radical having 4 to 24 carbons.

(b) Secondary amines:

A secondary amine represented by $R_2NH$ where R is an alkyl or aryl radical having 4 to 24 carbons.

Petroleum hydrocarbons used for dilution of the extractant in the present invention include aromatic hydrocarbons, an aliphatic hydrocarbons and a mixture thereof. A mixture of various hydrocarbons like kerosine is frequently used.

The extractant in the present invention is employed at a concentration within the range of from 5% to 80% depending on the concentration of titanium, the concentration of sulfate, and the kind and the concentration of the impurity metal ions.

The anion-selective dialysis membrane utilized for the recovery of sulfuric acid from the extraction raffinate of the third step may be a microporous membrane of tetrafluoroethylene and polyethylene, or of styrene-divinylbenzene copolymer. For example, Selemion AMV, DMV (trade name, made by Asahi Glass Co., Ltd.), Aciplex A-101 (trade name, made by Asahi Chemical Industry Co., Ltd.), AVS-4T, and ACH-45T (trade name, made by Tokuyama Soda Co., Ltd.), and other anion-selective dialysis membrane exhibiting similar performance thereto are all useful for this purpose.

In the present invention, the raffinate of extraction of the fourth step is concentrated and used for sulfation (or solid digestion) of the raw material such as titanium-iron ore, titanium slag, and/or a titanium-containing industrial waste. The raffinate, which contains little metal ions, may be concentrated by means of an apparatus such as a conventional evaporation-condensation apparatus and a less energy-consuming multiple-effect evaporator without discharging a concentrated metal sulfate solution from the bottom of the apparatus during the concentration, which is greatly different from the methods disclosed in U.S. Pat. Nos. 4,499,058 and 4,734,271.

The embodiment of the present invention is explained below in more detail by reference to figures. The present invention, however, is not limited thereto.

FIG. 1 is a flow sheet illustrating a basic type of operation of the present invention.

In the first step, a titanyl sulfate-containing liquid A, which contains impurity metal ions, is introduced to the extraction stage of the first step, where the titanium ion in the sulfuric acid solution is extracted by contact with an organic solvent (a) composed of one or more extractants selected from the group of oxygen-containing extractants and alkylamine extractants and a petroleum hydrocarbon diluent into the organic phase (a) as a sulfuric acid complex. The organic solvent (a) containing the extracted titanium-sulfuric acid complex is introduced to stripping stage C, where the organic solvent (a) is brought into contact with water or dilute sulfuric acid (d) or dilute titanyl sulfate-containing solution (f') to strip the titanium-sulfuric acid complex from the organic solvent (a) to an aqueous solution (d') and to regenerate the organic solvent (a) and to be recycled to the extraction stage.

The titanium-sulfuric acid complex (d') transferred to the aqueous solution in the stripping stage C of the first step is introduced to the hydrolysis stage F of the second step, where the titanium-sulfuric acid complex is hydrolyzed to give insoluble titanium hydroxide and a filtrate (h). The titanium hydroxide is calcined to produce titanium dioxide.

The raffinate of extraction of the first step (e) and (e'), which still contains titanium ion, is introduced partly or wholly to the extraction stage D of the third step, where the raffinate is brought into contact with an organic solvent (b) composed of one or more extractants selected from the group of oxygen-containing extractants and alkylamine extractants and a petroleum hydrocarbon diluent to extract the titanium ion as a sulfuric acid complex, giving extraction raffinate (g). The organic solvent (b) containing the extracted titanium is introduced to the stripping stage E, where the organic solvent is brought into contact with water, dilute sulfuric acid or dilute titanyl sulfate solution (f) to transfer the titanium-sulfuric acid complex from the organic solvent to aqueous solution (f)' and to regenerate the organic solvent (b).

The solution (f)' leaving the stripping stage is employed as the stripping solution of the first step, or employed for scrubbing, and the titanium in the aqueous solution is introduced to the hydrolysis stage of the second step.

Figure 2:
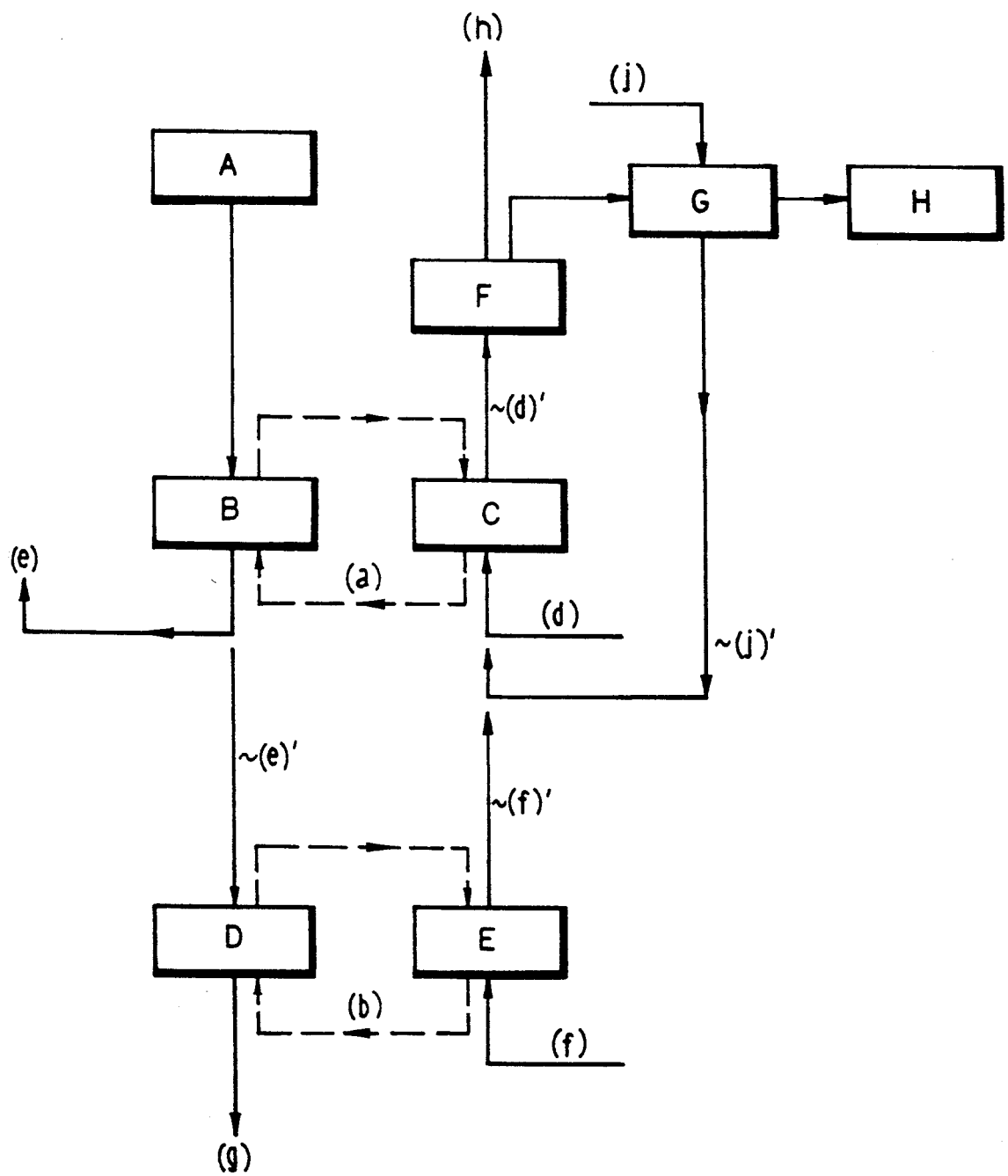
FIG. 2 is a flow sheet of a process comprising treatment of a liquid having employed for washing of insoluble titanium hydroxide formed in the second step in addition to the process of FIG. 1.

The flow sheet of FIG. 2 is basically the same as that of FIG. 1, but a rinsing stage G is added where the insoluble titanium hydroxide formed in the hydrolysis stage of the second step is rinsed, and the rinsing liquid (j)' leaving the rinsing stage is employed for stripping of the titanium-sulfuric acid complex extracted into the organic solvent (a) in the stripping stage of the first step.

Figure 3:
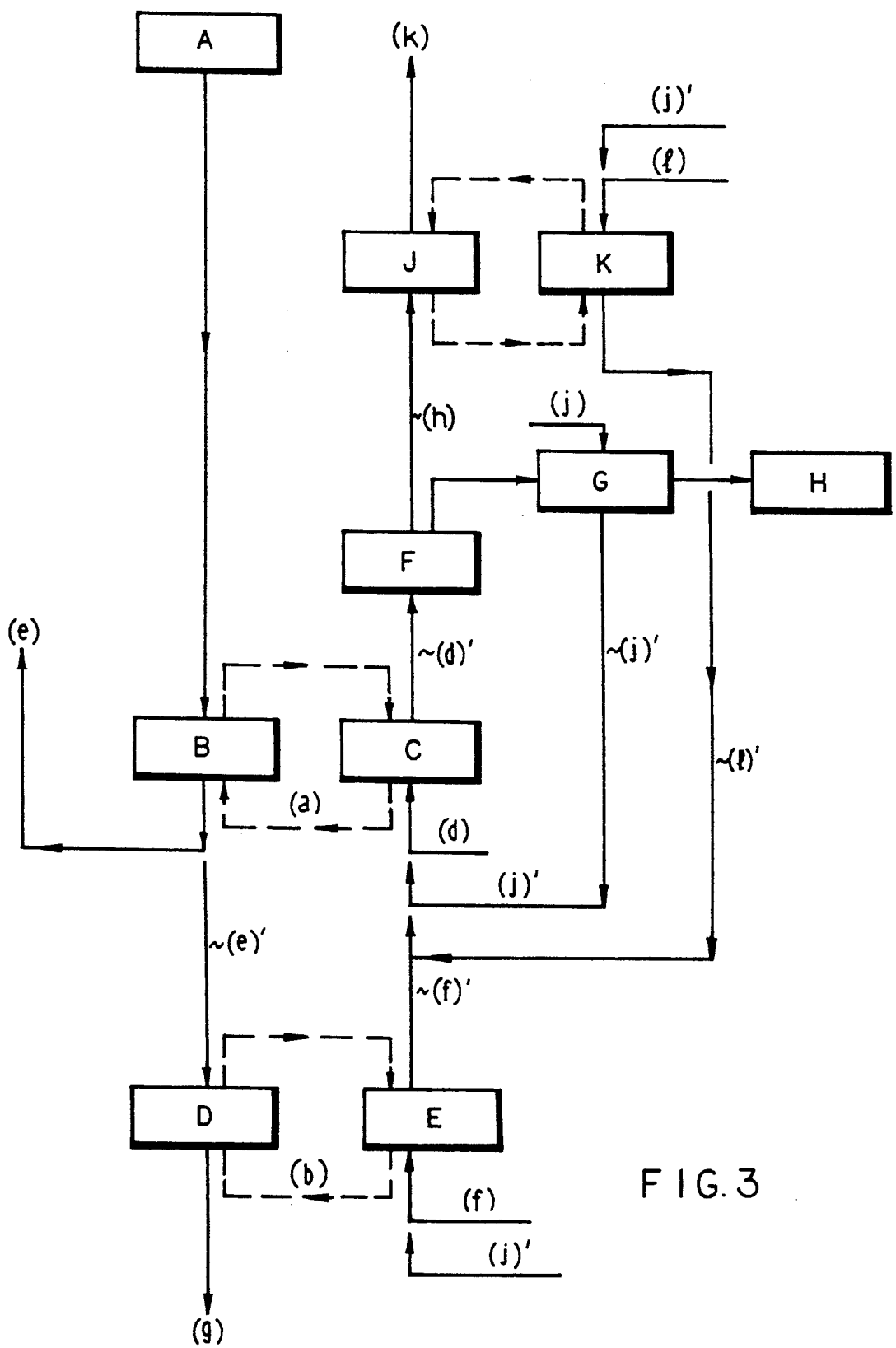
FIG. 3 is a flow sheet of a process comprising, in addition to the process of FIG. 2, a fourth step in which the solution after hydrolysis is treated to convert all the titanium extracted and recovered in the third and the fourth steps into insoluble titanium hydroxide.

The flow sheet of FIG. 3 is basically the same as those of FIG. 1 and FIG. 2. In FIG. 3, however, the sulfuric acid solution (h) separated from the insoluble titanium hydroxide formed by a known hydrolysis method in the second step is introduced to the fourth step, where the sulfuric acid solution is brought into contact with an organic solvent (c) composed of one or more extractants selected from oxygen-containing extractants and alkylamine extractants and a petroleum hydrocarbon diluent at the extraction stage J to extract the titanium ion in the sulfuric acid solution to the organic solvent (c) as a sulfuric acid complex and to give an extraction raffinate (k).

Subsequently, the organic solvent (c) containing the extracted titanium-sulfuric acid complex is introduced to the stripping stage K, where the organic solvent is brought into contact with water or dilute sulfuric acid (1) and/or the rinsing liquid (j)' having used for rinsing of titanium hydroxide in the second step to transfer the titanium-sulfuric acid complex from the organic phase to the aqueous solution (1)' and to regenerate the organic solvent (c). The stripping liquid (1)' having used for stripping in the fourth step is recycled to the stripping stage of the first step. In such a manner, all of the titanium extracted by the organic solvents (a), (b), and (c) is converted to titanium hydroxide.

Figure 4:
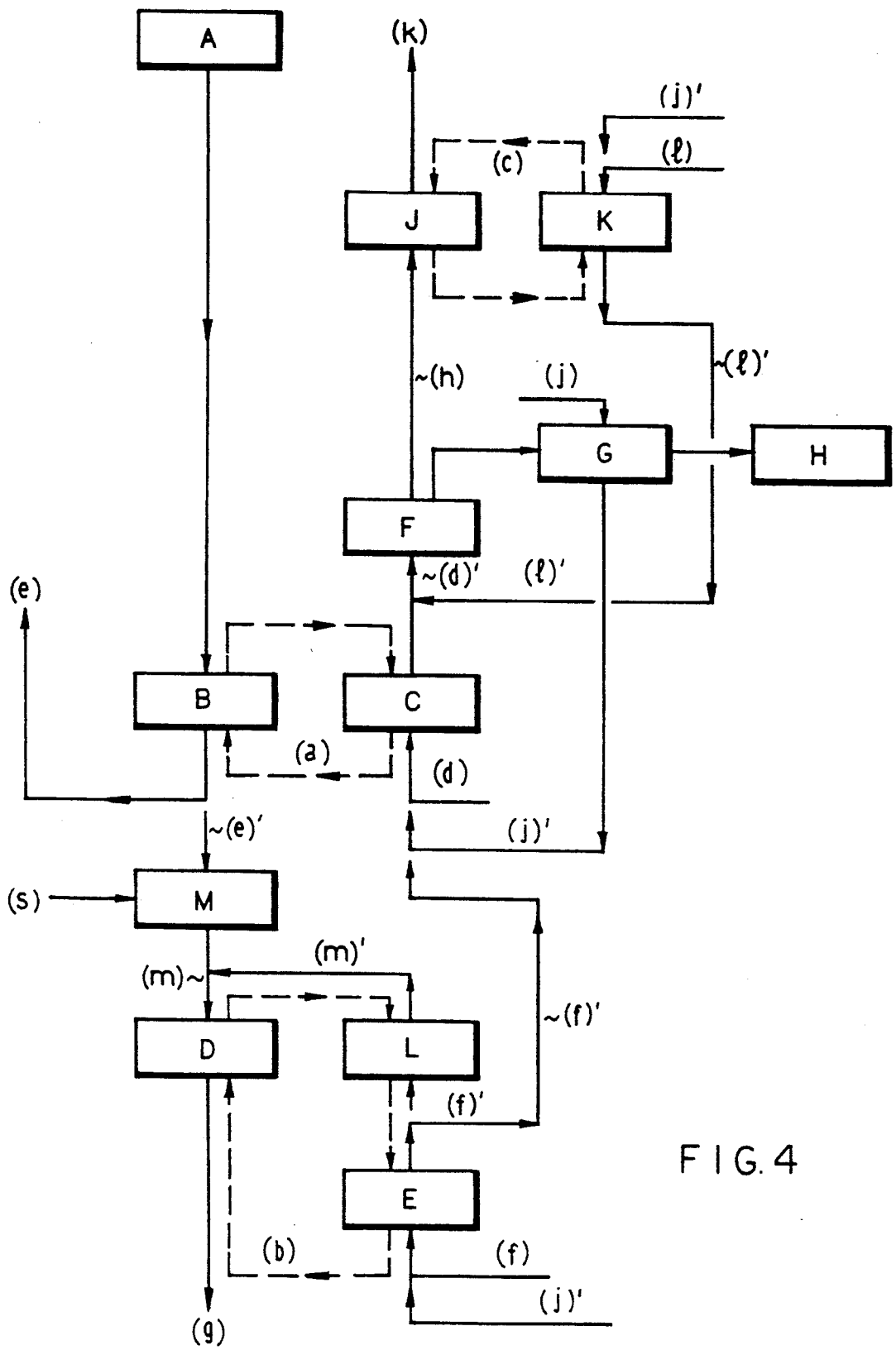
FIG. 4 is a flow sheet of a process comprising additionally mixing the raffinate of the extraction of the first step with a chloride, extracting the titanium as a chloride complex, and converting it into titanyl chloride.

The flow sheet of FIG. 4 is basically the same as that in FIG. 3. In FIG. 4, however, the extraction raffinate (e) and (e)' of the extraction stage B of the first step is partly or wholly introduced to a mixing stage M, where at least one of the compounds (s) selected from the chlorine compounds of H, Na, NH$_4$, K, Mg, Fe, and Ti is added to the raffinate (e)'. The liquid (m) is introduced to the extraction stage D of the third step and is brought into contact with the organic solvent (b) to extract the chloride complex and the sulfuric acid complex of titanium to the organic solvent.

Subsequently, the organic solvent (b) containing the extracted chloride complex and sulfuric acid complex of titanium is introduced to a scrubbing stage L, where the organic solvent is brought into contact with a portion of the liquid (f)' containing titanyl sulfate coming from the stripping stage E to transfer selectively the metal chloride complex, chlorine ion and metal ions other than titanium from the organic solvent to the aqueous solution. The stripping liquid (m)' leaving the stripping stage is recycled to the extraction stage D.

The organic solvent (b), which contains only the titanium-sulfuric acid complex, is brought into contact with water or dilute sulfuric acid (f) or a dilute sulfuric acid solution (j)' to transfer the titanium-sulfuric acid complex from the organic phase to the aqueous solution to regenerate the organic solvent (b).

The titanyl sulfate-containing liquid (f)' after being used for the stripping is introduced through the stripping stage C of the first step to the hydrolysis stage F of the second step.

The titanyl sulfate-containing liquid (j)' derived by stripping of the titanium-sulfuric acid complex from the organic solvent (c) in the fourth step is introduced to the hydrolysis stage F of the second step, where it is hydrolyzed together with the titanium sulfate containing solution (d)' by a conventional method to give insoluble titanium hydroxide through the rinsing stage G.

The aqueous solution (h) from which the titanium hydroxide has been separated is introduced to the extraction stage J, and the rinsing liquid (j)' leaving the rinsing stage is recycled for stripping in the first, third, and fourth steps.

Figure 5:
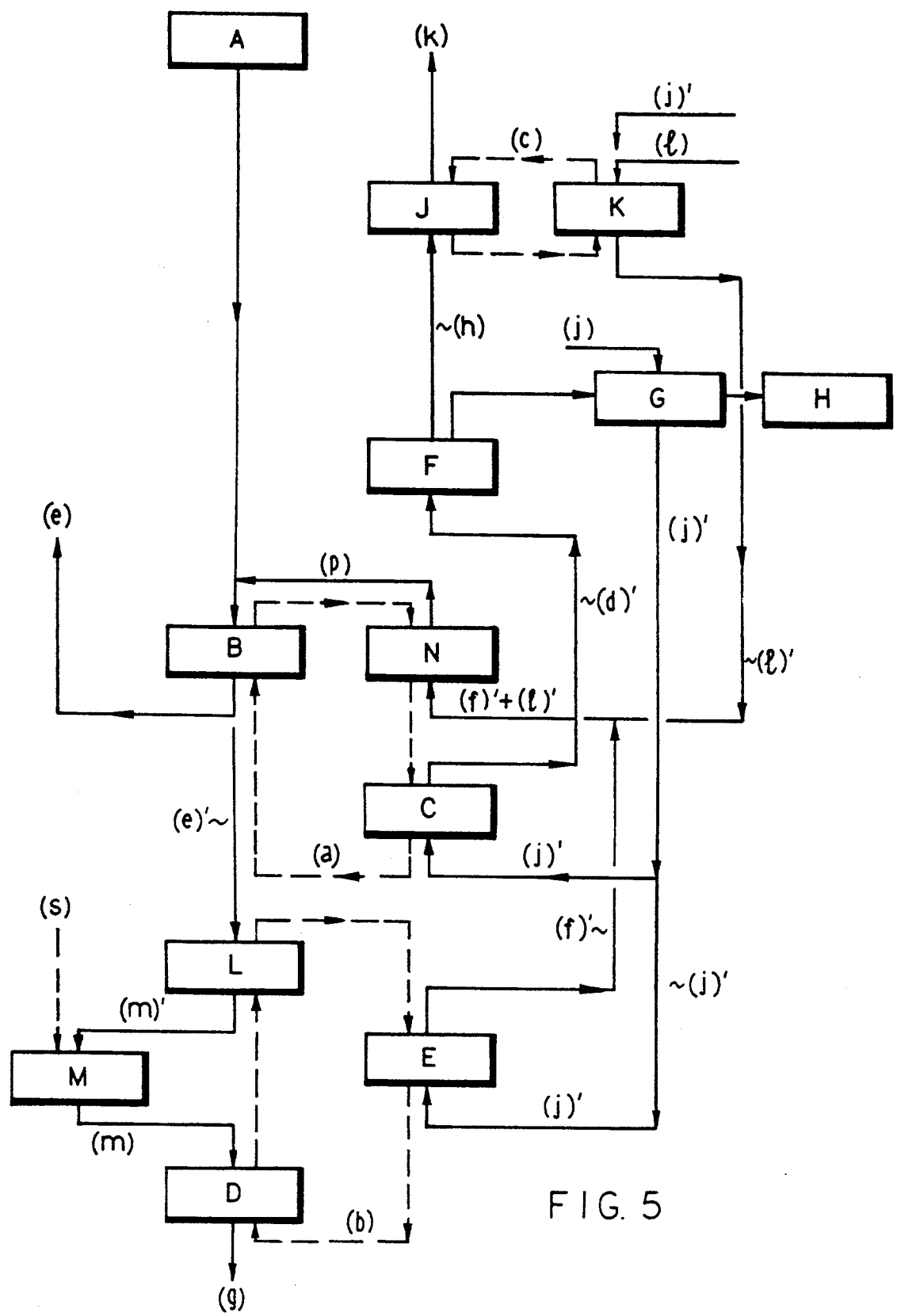
FIG. 5 is a flow sheet of a process similar to the process of FIG. 4, but comprising a scrubbing treatment for removing chlorine and a chloride complex in the organic phase prior to chloride and recycling all the titanyl sulfate recovered in the third step and the fourth step.

The flow sheet of FIG. 5 is basically the same as that of FIG. 4. In FIG. 5, the whole of the raffinate (e) of the first step, or a portion thereof (e)' is brought into contact, before introduction to the mixing stage M, with the organic solvent (b) containing the extracted titanium-chloride complex and the sulfuric acid complex in the scrubbing stage L, where the metal chloride complex and the chlorine ion in the organic solvent are selectively transferred into an aqueous solution (m)' to make the organic solvent contain only titanium-sulfuric acid complex.

The organic solvent (b) is brought into contact at the stripping stage E with the rinsing liquid (j)' having used for rinsing titanium hydroxide in the second step to transfer the titanium-sulfuric acid complex to the aqueous solution (f)', thus the organic solvent (b) being regenerated.

The stripping liquid (1)' used for stripping and containing titanyl sulfate from the fourth step and that (f)' from the third step are introduced to the scrubbing stage N and are brought into contact with the organic solvent (a) containing a titanium-sulfuric acid complex. This transfers the metal ions other than titanium and the metal sulfuric acid complex selectively from the organic solvent to the aqueous solution (p) to purify the titanium-sulfuric acid complex contained in the organic solvent (a). The scrubbing liquid (p) after the scrubbing is introduced to the extraction stage.

Figure 6:
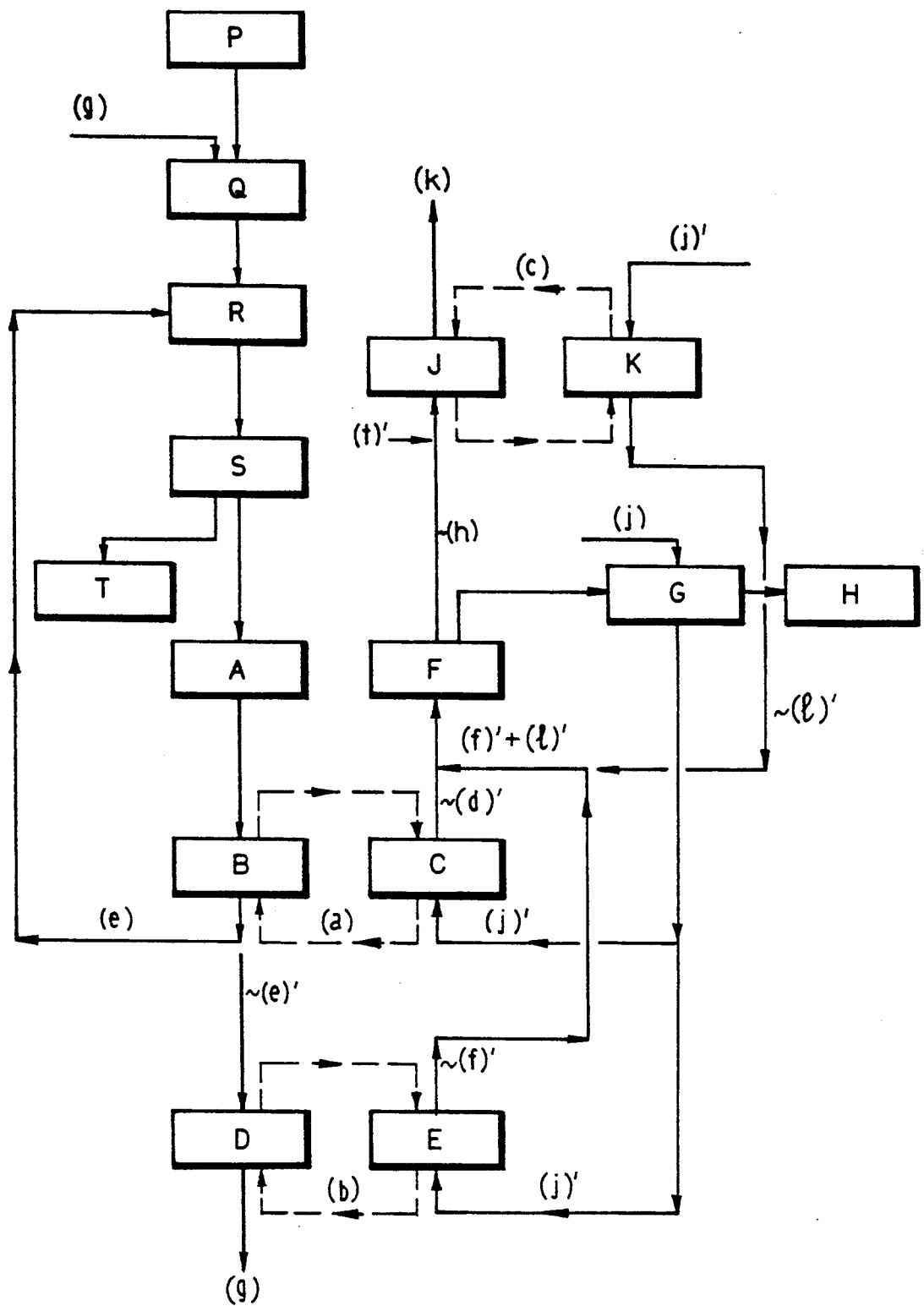
FIG. 6 is a flow sheet of a process similar in principle to that of FIG. 2, but comprising recycling the raffinate of extraction of the first step to the starting material, and increasing the concentration of zirconium, niobium, chromium, vanadium, manganese, aluminum, magnesium, zinc etc. contained in the starting material in a minute amount in the raffinate of the extraction of the third step to the economically recoverable level.

FIG. 6 is a flow sheet which is basically the same as that in FIG. 3. In FIG. 6, the titanium-containing raw material P (titanium iron ore, titanium slag, and/or a titanium-containing industrial waste) is introduced to a sulfation stage Q, where it is mixed with concentrated sulfuric acid (g) and digested at an elevated temperature. The reaction product after completion of the reaction is introduced to a dissolution stage R, and are dissolved in the extraction raffinate (e) of the extraction stage B of the first step. The resulting solution is introduced to a crystallization stage S to remove iron ion as crystalline ferrous sulfate. The resulting solution A is led to the extraction stage B.

Figure 7:
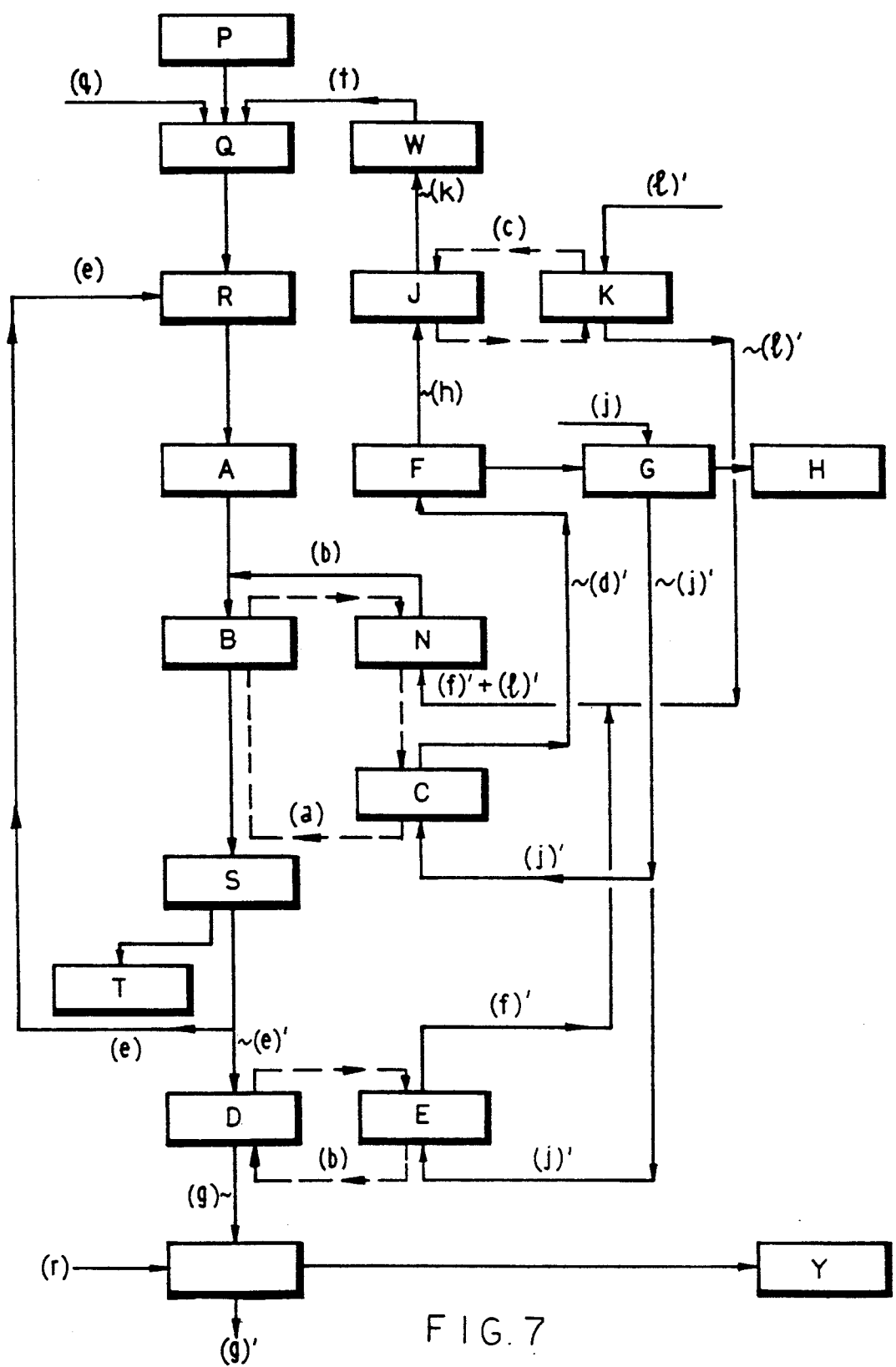
FIG. 7 is a flow sheet of a process comprising, in addition to the process of FIG. 6, introducing the raffinate of the fourth step to evaporation condensation step to recover concentrated sulfuric acid, and introducing the raffinate of the third step to an anion dialysis membrane apparatus to recover free sulfuric acid from the raffinate of the third step.

The flow sheet of FIG. 7 is basically the same as those shown in FIG. 1, FIG. 5, and FIG. 6. In FIG. 7, the removal of iron ion is modified as below. The sulfation reaction product is dissolved at the dissolution stage R and then introduced to the extraction stage B of the first step, where most part of the titanium in the sulfuric acid solution is extracted as a sulfuric acid complex to the organic solvent (b). The raffinate is led to the crystallization apparatus S, where iron ion contained in the raffinate is removed as crystalline ferrous sulfate T. As another modification, the extraction raffinate (g) of the third step is introduced to an apparatus U having chambers partitioned by an anion dialysis membrane, where free acid is removed from the raffinate by utilizing the difference of the sulfuric acid concentration from clear water, thus obtaining sulfuric acid Y containing no metal ion, and a solution (g)' containing ions of zirconium, niobium, chromium, vanadium, manganese, aluminum, magnesium, and iron.

Figure 8:
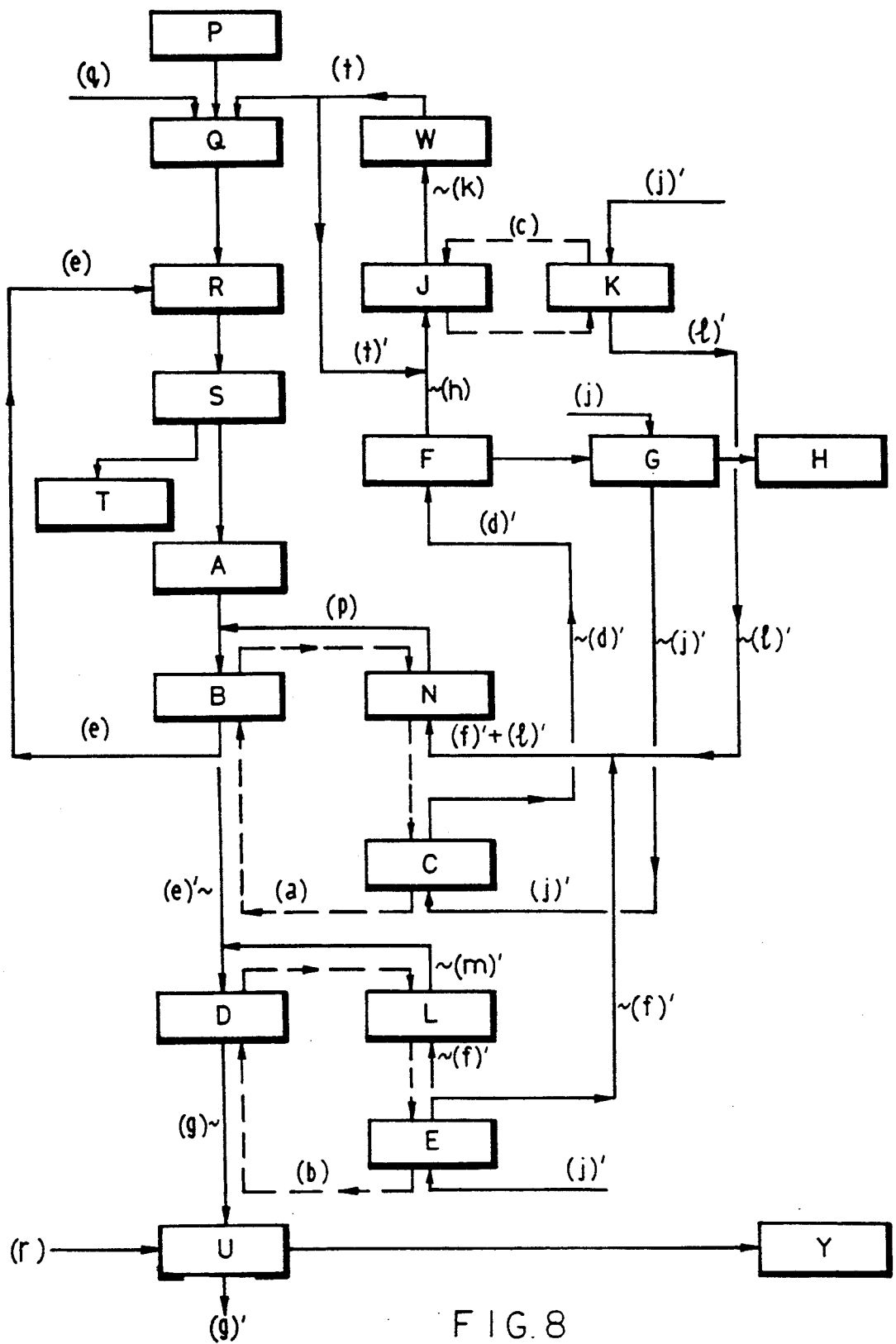
FIG. 8 is a flow sheet of a process comprising, in addition to the process of FIG. 7, adding concentrated sulfuric acid to the solution after hydrolysis transferred to the fourth step and introducing it to an extraction stage.

The flow sheet of FIG. 8 is basically same as that of FIG. 5. In FIG. 8, concentrated sulfuric acid (t)' is added to the liquid (h) after hydrolysis before the solution is lead to the extraction stage J of the fourth step. The extraction raffinate (k) of the fourth step is introduced to a conventional evaporation-concentration stage W to give concentrated sulfuric acid (t). The resulting concentrated sulfuric acid (t) is recycled to the digestion stage Q for sulfating the raw material P.

Figure 9:
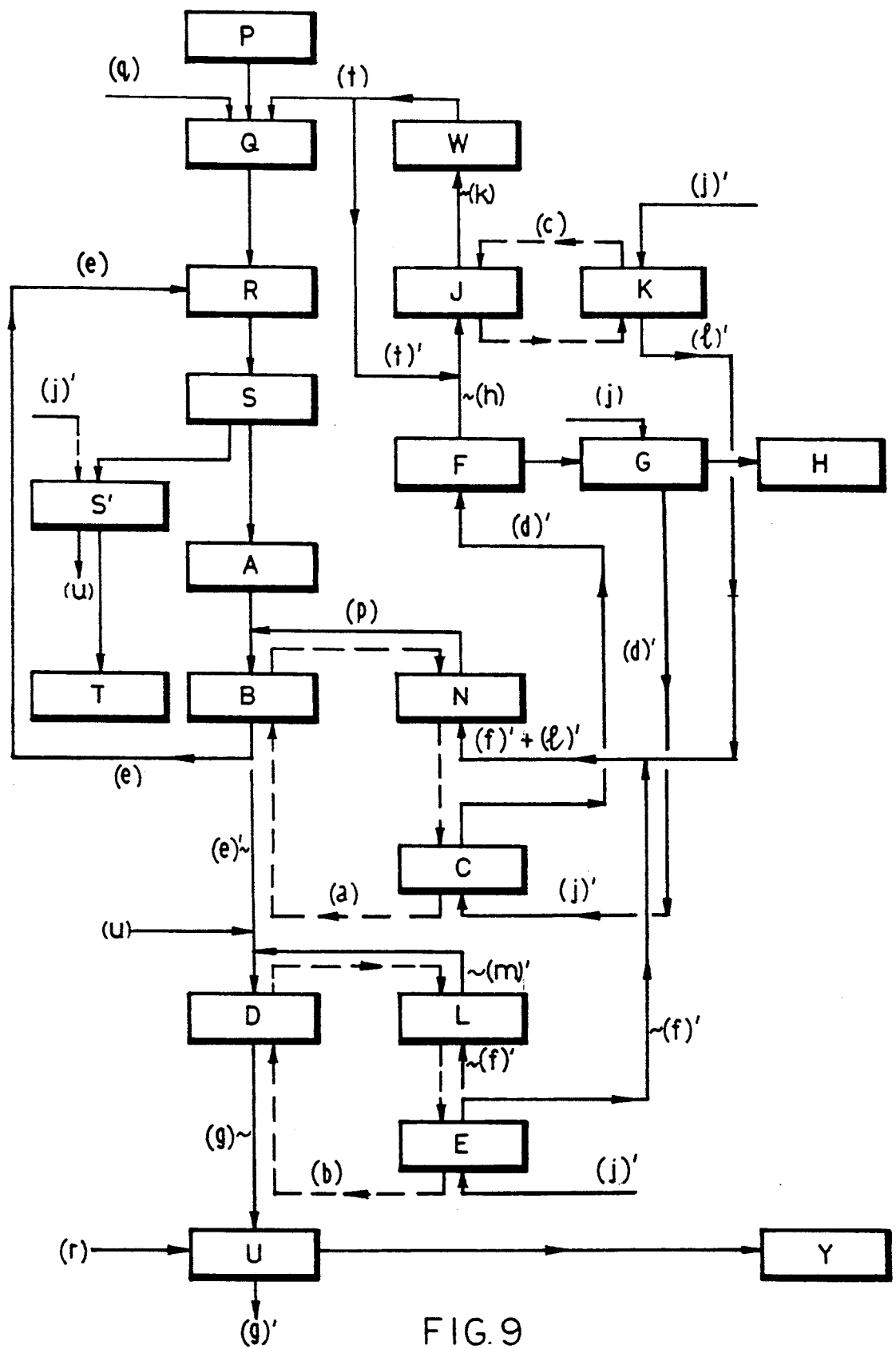
FIG. 9 is a flow sheet of a process comprising, in addition to the process of FIG. 8, introducing ferrous sulfate derived in a crystallization stage S into a recrystallization stage S', dissolving it in a liquid (j)' having employed for washing in titanium washing stage G to obtain a recrystallized product T, and introducing the mother liquor of the crystallization before the extraction stage of the third step.

The flow sheet of FIG. 9 is basically the same as that in FIG. 8. In FIG. 9, the ferrous sulfate obtained at the crystallization stage S is introduced to a recrystallization stage S' where the ferrous sulfate is dissolved with the rinsing liquid (j)' having been used in the titanium hydroxide-rinsing stage G to give recrystallized product T. The mother liquor (u) of the recrystallization is added to the extracting solvent for the extraction stage of the third step.

The present invention is explained by reference to examples.

The raw material employed for preparing the titanium ion-containing sulfuric acid had the compositions as shown in Table 1. In the experiments, two kinds of the raw materials are suitably mixed and pulverized.

TABLE 1

| | Analysis of Raw Materials | | | | | | | | |
|---|---|---|---|---|---|---|---|---|---|
| | (% by weight) | | | | | | | | |
| Material | $TiO_2$ | FeO | $Fe_2O_3$ | $Cr_2O_3$ | $Al_2O_3$ | $ZrO_2$ | $Nb_2O_5$ | MgO | $V_2O_5$ | Mn |
| Ilumenite | 52.6 | 34.3 | 6.5 | 0.02 | 1.3 | 0.1 | 0.2 | 0.1 | 0.04 | 2.6 |
| Slag | 85.5 | 10.8 | — | 0.22 | 1.2 | 0.1 | 0.13 | 0.9 | 0.5 | 1.6 |

The raw materials above were pulverized to a particle size of 325 mesh or smaller, and were mixed with sulfuric acid of not less than 90% concentration. The mixture was digested at a high temperature of from 160° to 200° C. for 24 hours. The digested product was leached with water, dilute sulfuric acid, or a metal sulfate-containing solution which is shown as an example in Table 2 to prepare a starting material of the present invention.

TABLE 2

| Metal Sulfate-containing Solution for Dissolution | | | | | | | | | |
|---|---|---|---|---|---|---|---|---|---|
| (Unit: g/l) | | | | | | | | | |
| Total $H_2SO_4$ | $TiO_2$ | Fe | Cr | Al | $ZrO_2$ | $Nb_2O_5$ | Mg | $V_2O_5$ | Mn |
| 680.7 | 1.9 | 28.1 | 2.0 | 4.3 | 2.2 | 2.8 | 0.83 | 4.8 | 42.6 |

The above sulfate-containing solution is merely an example out of various sulfate-containing solutions. The starting materials employed in the experiments were prepared by leaching the sulfated raw materials with the sulfate-containing solution, and cooled to a temperature of 4° to 15° C. to remove the iron ion as crystalline $FeSO_4.7H_2O$. The compositions are shown in Table 3.

[a] First Step

TABLE 3

| | Solutions for Treatment in First Step | | | | | | | | |
|---|---|---|---|---|---|---|---|---|---|
| | (Unit: g/l) | | | | | | | | |
| Kind | $H_2SO_4$ (total) | $TiO_2$ | Fe | Cr | Al | $ZrO_2$ | $Nb_2O_5$ | Mg | $V_2O_5$ | Mn |
| A | 710.0 | 208.1 | 42.5 | 2.4 | 3.9 | 1.8 | 2.4 | 1.33 | 6.1 | 7.1 |
| B | 780.6 | 87.4 | 28.6 | 2.2 | 5.8 | 2.3 | 2.9 | 0.89 | 5.0 | 45.1 |

The continuous extraction tests were conducted by employing two kinds of organic solvents: Solvent (A) consisting of 20% of trioctylphosphine oxide, 5% of dioctylacetamide, and the balance of a paraffin diluent; and Solvent (B) consisting of 15% of trioctylphosphine oxide, 15% of octyl dioctylphosphinate and the balance of a paraffin diluent.

TABLE 4

| Continuous Extraction Tests for First Step (1) | | | | | | | |
|---|---|---|---|---|---|---|---|
| (Unit: g/l) | | | | | | | |
| Kind | Phase | $TiO_2$ | Fe | Cr | Mn | $V_2O_5$ | $H_2SO_4$ (total) |
| A | Organic | 32.1 | 0.12 | <0.01 | <0.01 | <0.01 | 80.4 |
| | Aqueous | 36.6 | 41.9 | 2.4 | 7.1 | 6.1 | 391.7 |
| B | Organic | 27.4 | <0.01 | <0.001 | <0.001 | <0.001 | 40.3 |
| | Aqueous | 5.2 | 28.4 | 2.2 | 44.9 | 4.9 | 686.7 |

Extraction conditions:
A) Liquid temperature: 24.5° C., Extraction: two stages
Flow ratio (Organic/Aqueous) in extraction: 73 1/10 1
Flow ratio (Organic/Aqueous) in stripping: 73 1/0.4 1
(B) Liquid temperature: 28° C., Extraction: three stages
Flow ratio (Organic/Aqueous) in extraction: 30 1/10 1
Flow ratio (Organic/Aqueous) in stripping: 30 1/0.15 1

For the stripping liquid, various sulfate salt solutions, sulfuric acid-containing solutions, and the stripping solution used for the stripping may be used. In these tests, the stripping solution shown in Table 5 was used for (A), and the stripping solution after stripping shown in Table 8 was used for (B).

The organic solvent leaving the extraction stage may be stripped by use of water, dilute sulfuric acid, or the like. In the present tests, the stripping liquid for the third step and the rinsing liquid after rinsing of titanium hydroxide were used for continuous stripping tests. The results are shown in Table 5.

TABLE 5

| Continuous stripping Tests for First Step (1) | | | | | | | |
|---|---|---|---|---|---|---|---|
| (Unit: g/l) | | | | | | | |
| Classification | Phase | $TiO_2$ | Fe | Cr | Mn | $V_2O_5$ | $H_2SO_4$ |
| A | Organic | 8.5 | <0.001 | <0.001 | <0.001 | <0.001 | 36.8 |
| | Aqueous | 193.9 | 0.045 | <0.001 | <0.001 | <0.001 | 427.0 |
| B | Organic | 0.12 | <0.001 | <0.001 | <0.001 | <0.001 | 9.0 |
| | Aqueous | 191.9 | 0.008 | 0.007 | <0.001 | <0.001 | 421.4 |

TABLE 5-continued

| Classification | Phase | TiO$_2$ | Fe | Cr | Mn | V$_2$O$_5$ | H$_2$SO$_4$ |
|---|---|---|---|---|---|---|---|
| | ous | | | | | | |

Continuous stripping Tests for First Step (1) (Unit: g/l)

Stripping condition:
Temperature: A: 24.5° C., B: 28° C.
Number of stripping stages: 6 stages
Flow ratio (organic/aqueous) A: 73 l/13.3 l, B: 30 l/4.3 l

[b] Second Step

The liquid after the stripping obtained in Table 5 (A) is subjected to hydrolysis according to the method disclosed in U.S. Pat. No. 2,253,595 and other known literature.

As the results, in the liquid after the hydrolysis, the concentration of sulfuric acid was 341 g/l, and the concentration of TiO$_2$ was 9.0 g/l, which shows that 94% of the titanium before the hydrolysis was converted to insoluble titanium hydroxide.

The liquid after the stripping (B) in Table 5 was also subjected to hydrolysis according to a known method to give insoluble titanium hydroxide.

The results of the analysis of the solution after separation of titanium hydroxide and rinse water after the rinse are shown in Table 6.

TABLE 6

Analysis of Hydrolysis Filtrate and Rinse Water (Unit: g/l)

| | TiO$_2$ | Fe | Cr | Mn | V$_2$O$_5$ | H$_2$SO$_4$ (Total) |
|---|---|---|---|---|---|---|
| Filtrate after hydrolysis | 9.1 | 0.004 | 0.005 | <0.001 | 0.007 | 270.4 |
| Water after rinse of titanium hydroxide | 0.8 | <0.001 | <0.001 | <0.001 | <0.001 | 54.3 |

[c] Third Step

A portion of the extraction raffinate of the continuous extraction test (B) shown in Table 4 was introduced to the third step, and tested for continuous extraction, before the recovery of Nb$_2$O$_5$, ZrO$_2$, Mn, Al, Cr, V$_2$O$_5$, Fe and Mg contained in the sulfuric acid solution, by use of an organic solvent (c) consisting of 15% of trioctylphosphine oxide, 15% of dioctylacetamide, and the balance of a paraffin diluent, and an organic solvent (d) consisting of 10% of trioctylphosphine oxide, 7.5% of dipentyl pentylphosphonate, and the balance of a paraffin-naphthene mixture diluent. The results are shown in Table 7.

TABLE 7

Continuous Extraction Tests of Third Step (2) (Analysis of Discharged Liquids) (Unit: g/l)

| Classification | Phase | H$_2$SO$_4$ (total) | TiO$_2$ | Fe | Cr | Mn | V$_2$O$_5$ | Al | ZrO$_2$ | Nb$_2$O$_5$ | Mg |
|---|---|---|---|---|---|---|---|---|---|---|---|
| C | Organic | 42.3 | 11.5 | 0.02 | 0.06 | <0.001 | 0.02 | <0.001 | <0.01 | <0.01 | <0.001 |
| | Aqueous | 664.5 | 0.01 | 20.4 | 2.2 | 44.9 | 4.8 | 4.3 | 2.2 | 2.8 | 0.83 |
| D | Organic | 39.1 | 16.2 | 0.01 | <0.01 | <0.001 | <0.01 | <0.001 | <0.01 | <0.01 | <0.001 |
| | Aqueous | 297.4 | 0.3 | 41.6 | 2.4 | 7.1 | 6.1 | 3.7 | 2.2 | 2.7 | 1.33 |

Extraction conditions:
Temperature: 24.5° C.–28° C.
Number of extraction stages: three stages
Extraction flow ratio (organic/aqueous):
C: 0.14 l/0.3 l, D: 0.15 l/0.5 l
Scrubbing flow ratio (organic/aqueous):
C: 0.14 l/0.002 l, D: 0.15 l/0.003 l The scrubbing liquid used was the stripping liquid after the stripping shown in Table 8.

Stripping tests were conducted by using the rinsing liquid after the rinse of the titanium hydroxide as shown in Table 6. The results are shown in Table 8.

TABLE 8

Stripping Test of Third Step (2) (Analysis of discharged liquids) (Unit: g/l)

| Classification | Phase | TiO$_2$ | Fe | Cr | Mn | V$_2$O$_5$ | H$_2$SO$_4$ (total) |
|---|---|---|---|---|---|---|---|
| C | Organic | 0.2 | <0.001 | <0.001 | <0.001 | <0.001 | 9.7 |
| | Aqueous | 40.4 | 0.11 | 0.20 | <0.001 | 0.07 | 168.4 |
| D | Organic | 0.13 | <0.001 | <0.001 | <0.001 | <0.001 | 4.9 |
| | Aqueous | 38.5 | 0.04 | <0.01 | <0.001 | <0.01 | 187.2 |

Stripping conditions:
Temperature: 24.5° C.–28° C.
Number of stages of stripping: three stages
Flow ratio (organic/aqueous):
C: 0.14 l/0.042 l, D: 0.15 l/0.038 l From the stripping liquid after stripping, 0.002 l of C, or 0.003 l of D was employed for the scrubbing solution in extraction test (2).

Test of Titanium Chloride Complex Extraction in Third Step

To the extraction raffinate of the first step, sodium chloride was added as a metal chloride, giving a solution shown in Table 9. This liquid was used for the test. The organic solvent E was used which consists of 20% by volume of trioctylphosphine oxide and the balance of a paraffin diluent. The extraction apparatus mentioned above was employed for the test. The results are shown in Table 9.

TABLE 9

TiOCl$_2$ Extraction Test (3) (Unit: g/l)

| | H$_2$SO$_4$ (total) | HCl (total) | TiO$_2$ | Fe | Cr | Na |
|---|---|---|---|---|---|---|
| Starting liquid | 353.5 | 15.6 | 12.2 | 41.9 | 2.4 | 10.3 |
| E: Organic phase | 9.4 | 7.6 | 12.2 | 0.3 | <0.01 | <0.01 |
| Aqueous | 342.5 | 8.0 | <0.1 | 41.6 | 2.4 | 10.3 |

TABLE 9-continued

TiOCl$_2$ Extraction Test (3)

(Unit: g/l)

| phase | H$_2$SO$_4$ (total) | HCl (total) | TiO$_2$ | Fe | Cr | Na |
|---|---|---|---|---|---|---|

Extraction conditions:
Temperature: 24.5° C.–28° C.
Number of extraction stages: three stages
Flow ratio (organic/aqueous): 0.14 l/0.14 l

Chloride Complex Scrubbing Test

The apparatus employed was the same as the one employed in the above chloride complex extraction test. The organic solvent E in Table 9 and the extraction raffinate of the first step were used. The results of the analysis of the two liquids before and after the test are shown in Table 10.

TABLE 10

Scrubbing Test by Extraction Raffinate (1)

(Unit: g/l)

| | | H$_2$SO$_4$ (total) | HCl (total) | TiO$_2$ | Fe | Na | Cr |
|---|---|---|---|---|---|---|---|
| Before test | Organic | 9.4 | 7.6 | 12.2 | 0.3 | <0.01 | <0.01 |
| | Aqueous | 391.7 | <0.1 | 36.6 | 41.9 | <0.1 | 2.4 |
| After test | Organic | 68.7 | <0.1 | 28.1 | <0.01 | <0.001 | <0.001 |
| | Aqueous | 332.4 | 7.6 | 20.7 | 42.2 | <0.1 | 2.4 |

Scrubbing condition:
Temperature: 24.5° C.
Flow ratio (organic/aqueous): 0.14 l/0.14 l
Number of scrubbing stage: one stage The organic solvent E after the scrubbing shown in Table 10 and the rinsing liquid having used for rinsing the insoluble titanium hydroxide in the second step (having sulfuric acid concentration of 50.5 g/l) were employed for stripping test. The result is shown in Table 11.

TABLE 11

Stripping Test (3)

Unit: g/l

| Phase | H$_2$SO$_4$ (total) | TiO$_2$ | Fe | Mn | Cr | V$_2$O$_5$ | Cl |
|---|---|---|---|---|---|---|---|
| Organic | 0.6 | 0.22 | <0.001 | <0.001 | <0.001 | <0.001 | <0.001 |
| Aqueous | 324.4 | 122.2 | <0.01 | <0.001 | <0.001 | 0.002 | 0.004 |

Stripping conditions:
Temperature: 24.5° C.
Number of stages of stripping: five stages
Flow ratio (organic/aqueous): 0.14 l/0.035 l

[d] Fourth Step

As understood from the composition of the filtrate separated after the hydrolysis, not all of the titanyl sulfate can be converted to insoluble titanium hydroxide by a conventional hydrolysis method. Therefore, the filtrate separated from the insoluble titanium hydroxide contains TiO$_2$. This filtrate was subjected to continuous extraction of the contained TiO$_2$. The result is shown in Table 12.

TABLE 12

Extraction Test of Fourth Step (4)
(Analysis of discharged liquid)

(Unit: g/l)

| Phase | TiO$_2$ | Fe | Cr | Mn | V$_2$O$_5$ | H$_2$SO$_4$ (total) |
|---|---|---|---|---|---|---|
| Organic | 9.5 | <0.001 | <0.001 | <0.001 | <0.001 | 26.0 |
| Aqueous | 0.002 | 0.004 | 0.005 | <0.001 | 0.007 | 254.6 |

Extraction Conditions:
Temperature: 28° C.
Number of extraction stage: four stages
Flow ratio (organic/aqueous): 10 l/10 l Concentrated sulfuric acid was added to the same hydrolysis system and subjected to extraction test by use of the same organic solvent. The result is shown in Table 13.

TABLE 13

Extraction Test of Fourth Step (5)

(Unit: g/l)

| | Phase | TiO$_2$ | Fe | Cr | Mn | V$_2$O$_5$ | H$_2$SO$_4$ (total) |
|---|---|---|---|---|---|---|---|
| Before test | Aqueous | 8.6 | 0.003 | 0.004 | <0.001 | 0.006 | 429.2 |
| After test | Organic | 25.8 | <0.001 | <0.001 | <0.001 | <0.001 | 41.0 |
| | Aqueous | <0.001 | 0.003 | 0.004 | <0.001 | 0.006 | 415.5 |

Extraction Conditions:
Temperature: 28° C.
Number of extraction stages: two stages
Flow ratio (organic/aqueous): 10 l/30 l In the stripping test, the water used for rinsing the insoluble titanium hydroxide was used for the stripping liquid. The result of the test is shown below.

TABLE 14

Stripping Test in Fourth Step (4)

(Unit: g/l)

| Classification | Phase | Amount of liquid | TiO$_2$ | H$_2$SO$_4$ (total) | Fe | Cr |
|---|---|---|---|---|---|---|
| (4) | Organic | 10 l | 0.4 | 11.1 | <0.001 | <0.001 |
| | Aqueous | 5 l | 19.1 | 84.1 | <0.001 | <0.001 |
| (5) | Organic | 10 l | 0.4 | 11.2 | <0.001 | <0.001 |
| | Aqueous | 2 l | 129.1 | 203.3 | <0.001 | <0.001 |

The aqueous phase having been used for the above stripping may be used for the stripping liquid of the first step or for the rinsing liquid to recover the titanium dioxide as insoluble titanium hydroxide.

[e] Acid Recovery Stage

The extraction raffinate shown in Table 12 or Table 13 is concentrated and recovered as 80–90% H$_2$SO$_4$ for use for sulfation reaction of the titanium raw material. The extraction raffinate shown in Table 7 contains free sulfuric acid in an amount of 442 g/l. This raffinate was introduced to a membrane-separation apparatus having chambers partitioned by anion-selective dialysis membrane, and the free sulfuric acid was recovered by flowing clear water through the both sides of the chamber. The anion-selective dialysis membrane was Selemion CMV (trade name, made by Asahi Glass Co., Ltd.). The result of analysis of the recovered liquid and the treated liquid is shown in Table 15.

TABLE 15

| | Test for Recovering Sulfuric Acid by Dialysis | | | | | | | | |
|---|---|---|---|---|---|---|---|---|---|
| | (Unit: g/l) | | | | | | | | |
| Liquid | $TiO_2$ | Fe | Cr | Mn | $V_2O_5$ | $H_2SO_4$ (total) | $ZrO_2$ | $Nb_2O_5$ | Al | Mg |
| Recovered liquid | <0.001 | <0.001 | 0.004 | <0.001 | 0.14 | 307.1 | <0.001 | <0.001 | <0.001 | <0.001 |
| Treated liquid | <0.01 | 20.4 | 2.2 | 44.9 | 2.7 | 358.0 | 2.0 | 2.9 | 5.8 | 0.89 |

The recovered sulfuric acid is concentrated by evaporation together with the extraction raffinate of the fourth step.

In the production of titanium dioxide by a sulfuric acid process according to the present invention, the consumption of 98% $H_2SO_4$ per ton of $TiO_2$ can be remarkably reduced to 1.4 tons for ilumenite, and 0.3 ton for titanium slag as the raw material in comparison with 3.7 tons and 2.2 tons respectively in conventional processes.

Further, according to the present invention, sulfuric acid salt solution is simultaneously obtained from which metals other than titanium, such as Al, Mg, V, Cr, Zr, Nb, and Mn, can be economically recovered, and various titanium-containing industrial waste may be used as the raw materials since the raw materials are not limited in the present invention.

The production process of titanium dioxide has been converted from sulfuric acid process to chlorine processes all over the world in spite of many advantages of the sulfuric processes because of great amount of industrial waste brought about thereby. However, the disadvantages in the sulfuric acid process are all cancelled by the present invention. The metals other than titanium such as Zr, Nb, Cr, and Mn produced by-products also reduce the production cost of the titanium advantageously.

The signification of the symbols used in the present specification are collectively shown below.

A: Titanyl sulfate solution: starting material of the present invention,
B: Extraction stage for titanium-sulfuric acid complex in first step,
C: Stripping stage for titanium-sulfuric acid complex in the first step,
D. Extraction stage for titanium-sulfuric acid complex or titanium-chloride complex in third step,
E: Stripping stage in third step,
F: Hydrolysis stage in the second step for hydrolyzing titanyl sulfate derived from stripping stage of first step,
G: Rinsing stage for insoluble titanium hydroxide
H: Titanium hydroxide,
J: Extraction stage in fourth step for extracting titanium-sulfuric acid complex from sulfuric acid solution after separation of titanium hydroxide in second step,
K: Stripping stage for titanium-sulfuric acid complex in fourth step,
L: scrubbing stage in third step (selective removal of chlorine ion and metal-chloride complex),
M: Mixing stage for chloride,
N: Scrubbing stage in first step for removing impurities from organic phase,
P: Titanium-iron ore (ilumenite or anatase), titanium slag, or titanium-containing industrial waste,
Q: Sulfation stage (digestion stage),
R: Dissolution stage (leaching stage) for digested solid,
S: Crystallization stage for ferrous sulfate,
T: Crystalline ferrous sulfate ($FeSO_4 \cdot nH_2O$)
U: Sulfuric acid recovery stage employing anion dialysis membrane apparatus,
W: Evaporation-concentration stage
Y: Sulfuric acid recovered by dialysis
(a), (b), and (c): Organic solvent composed of one or more extractants selected from group of oxygen-containing extractants and alkyl amine extractants, and petroleum hydrocarbon diluent,
(d): Stripping liquid to be used in stripping stage of first step: water of dilute sulfuric acid,
(d)': Stripping liquid after stripping at stripping stage of first step,
(e), and (e)': Extraction raffinate of first step: sulfuric acid solution containing titanium ion and other metal sulfates,
(f): Stripping liquid for stripping stage of third step,
(f)': Stripping liquid after stripping of third step,
(g): Extraction raffinate of third step,
(g)': Discharged liquid after acid recovery from extraction raffinate of third step by anion dialysis membrane,
(h): Filtrate after hydrolysis of second step,
(j): Rinsing liquid for insoluble titanium hydroxide formed at second step,
(j)': Rinsing liquid having used for rinsing titanium hydroxide at second step,
(k): Extraction raffinate of fourth step,
(l): Stripping liquid for stripping at fourth step,
(l)': Stripping liquid after stripping
(m): Mixture of extraction raffinate of first step with chloride,
(m)': Scrubbing solution after scrubbing for removal of chlorine ion and metal-chloride complex from organic solvent (b),
(r): Clear water to be supplied to acid recovery apparatus employing anion dialysis membrane,
(s): Chlorides of Na, $NH_4$, K, Mg, Fe, and Ti to be supplied to mixing stage,
(t): Concentrated sulfuric acid,
(t)': Concentrated sulfuric acid to be added to liquid after hydrolysis of second step introduced to extraction stage of fourth step,
(u): Mother liquor of recrystallization of ferrous sulfate.

What is claimed is:

1. A process for producing titanium dioxide which discharges no waste, comprising:
   step 1) contacting a sulfuric acid solution containing titanium ion and one or more metal ions with an organic solvent A, wherein the organic solvent A is composed of one or more extractants selected from the group consisting of oxygen-containing extractants and alkylamine extractants diluted with a petroleum hydrocarbon diluent, thereby extracting the titanium ion as a titanium-sulfuric acid complex (titanyl sulfate) into the organic solvent A;
   step 2) contacting the organic solvent A containing the titanium-sulfuric acid complex with an aqueous liquid to transfer the titanium-sulfuric acid complex from the organic solvent A into the aqueous liquid, thereby regenerating the organic solvent A;

step 3) hydrolyzing the aqueous liquid containing the titanium-sulfuric acid complex to form insoluble titanium hydroxide in the aqueous liquid;

step 4) rinsing the resulting insoluble titanium hydroxide with a rinsing liquid selected from the group consisting of dilute sulfuric acid and water;

step 5) contacting a part or all of the raffinate of the extraction in step 1 with an organic solvent B composed of one or more extractants selected from the group consisting of oxygen-containing extractants and alkylamine extractants diluted with a petroleum hydrocarbon diluent, thereby extracting the remaining titanium ion from the raffinate as a titanium-sulfuric acid complex; and step 6) contacting the organic solvent B containing the titanium extracted from the raffinate of step 1 as the titanium-sulfuric acid complex of step 5 with a stripping liquid selected from water, dilute sulfuric acid solution and dilute titanyl sulfate solution to strip the titanium-sulfuric acid complex from the organic solvent B into the stripping liquid and regenerate the organic solvent B;

wherein the aqueous liquid of step 2 is the rinsing liquid of step 4, the stripping liquid of step 6, or mixtures thereof.

2. The process for producing titanium dioxide of claim 1 wherein step 1 further comprises a scrubbing stage, and a part or whole of the stripping liquids having been used for the stripping is introduced to the scrubbing stage of step 1 and is brought into contact with the organic solvent A containing the extracted titanium-sulfuric acid complex to remove selectively the coextracted metal ions other than titanium from the organic solvent A to the stripping liquids.

3. The process for producing titanium dioxide of claim 1 wherein a portion or whole of the extraction raffinate of step 5 is introduced to a chamber of a membrane apparatus having chambers partitioned by an anion selective dialysis membrane, and clear water is introduced into the other partitioned chamber, to recover free sulfuric acid contained in the extraction raffinate by utilizing the difference in sulfuric acid concentration in between the chambers, and the recovered sulfuric acid is recycled to any one of the other steps.

4. The process for producing titanium dioxide of claim 1 wherein the extraction raffinate of step 1 is introduced to a crystallization apparatus to remove iron ion as ferrous sulfate, and is introduced to step 5 for dissolution of the raw material.

5. The process for producing titanium dioxide of claim 4 wherein the ferrous sulfate derived from the crystallization apparatus is dissolved in the rinsing liquid having used for rinsing the titanium hydroxide and recrystallized therefrom, and a part or whole of the mother liquor of the recrystallization is introduced to the extraction stage of step 5.

6. The process of claim 1 further comprising at the conclusion of step 1, recycling most of the raffinate of extraction for dissolving a sulfated raw material;

in step 5, mixing part of the raffinate of the extraction in step 1, with at least one compound selected from chlorine compounds of H, Na, NH$_4$, Mg, K, Fe and Ti before bringing the mixture into contact with organic solvent B; and contacting the organic solvent B containing extracted titanium-chloride complex and titanium-sulfuric acid complex with an aqueous titanyl sulfate-containing solution or an aqueous sulfuric acid solution to selectively transfer the metal chloride complex, the chlorine ion and a physically contaminating chloride into the aqueous titanyl sulfate-containing solution or an aqueous sulfuric acid solution prior to bringing organic solvent B containing extracted titanium into contact with water, dilute sulfuric acid solution or dilute titanyl sulfate solution to strip the titanium in the form of a sulfuric acid complex and regenerate organic solvent B for recycling to extraction.

7. The process of claim 6 wherein a part of the extraction raffinate of step 1 is introduced to step 5 and is brought into contact with the organic solvent B containing the extracted titanium-chloride complex to transfer the metal-chloride complexes and chloride ion in the organic solvent B to the part of the extraction raffinate, and then introducing the part of the extraction raffinate to a mixing stage for mixing chloride thereto.

8. The process for producing titanium dioxide of claim 6 wherein the chlorine compound to be mixed with the extraction raffinate of step 1 is titanium-containing industrial waste from a chlorine-process of titanium production.

9. The process of claim 1 further comprising step 7 comprising contacting a hydrolysis filtrate separated by filtration from the insoluble titanium hydroxide formed by hydrolysis in step 3 with an organic solvent C composed of an extractant selected from the group consisting of oxygen-containing extractants and alkylamine extractants diluted with a petroleum hydrocarbon diluent to extract the titanium ion contained in the hydrolysis filtrate as a sulfuric acid complex into organic solvent C; and contacting the organic solvent C with a stripping liquid selected from one or more of water, dilute sulfuric acid and the rinsing liquid from step 4 to strip the titanium-sulfuric acid complex from the organic solvent C into the stripping liquid and regenerate organic solvent C.

10. The process for producing titanium dioxide of claim 9 wherein the extraction raffinate of step 7 is introduced to an evaporation concentration step to raise the concentration of sulfuric acid, and is used for sulfation of a raw material including titanium-iron ore, titanium-containing slag, and/or titanium-containing industrial waste.

11. The process for producing titanium dioxide of claim 9 wherein a part or whole of the stripping liquid after stripping derived at step 6 and step 7 containing titanyl sulfate is brought into contact with the organic solvent B containing titanium-sulfuric acid complex to transfer selectively ions and ion complexes coextracted other than titanium ion from the organic solvent B to the stripping liquid.

12. The process for producing titanium dioxide of claim 9 wherein the liquid separated from the hydrolysis stage of step 3 is mixed with concentrated sulfuric acid to raise the free acid concentration before being introduced to step 7.

13. The process for producing titanium dioxide of claim 9 wherein the titanyl sulfate-containing solution derived from stripping of titanium-sulfuric acid complex from the organic solvent C at step 7 is introduced to the hydrolysis stage of step 3, and is hydrolyzed to produce insoluble titanium hydroxide.

14. The process for producing titanium dioxide of claim 9 wherein the organic solvents A, B, and C are composed of an extractant comprising one or more kinds of trialkylphosphine oxide, and from 1% to 500% thereto by volume of an a dialkylacetamide, and a petroleum hydrocarbon diluent.

15. The process for producing titanium dioxide of claim 9 wherein the organic solvents A, B, and C are composed of an extractant comprising one or more kinds of trialkylphosphine oxide, and from 1% to 500% thereto by volume of an alkyl ketone, and a petroleum hydrocarbon diluent.

16. The process for producing titanium dioxide of claim 9 wherein the organic solvents A, B, and C are composed of an extractant comprising one or more kinds of trialkylphosphine oxide, and from 1% to 500% thereto by volume of an alkyl dialkylphosphinate, and a petroleum hydrocarbon diluent.

17. The process for producing titanium dioxide of claim 9 wherein the organic solvents A, B, and C are composed of an extractant comprising one or more kinds of trialkylphosphine oxide, and from 1% to 500% thereto by volume of an dialkyl alkylphosphonate, and a petroleum hydrocarbon diluent.

18. The process for producing titanium dioxide of claim 9 wherein the organic solvents A, B, and C are composed of an extractant comprising one or more kinds of trialkylphosphine oxide, and from 1% to 500% thereto by volume of an alkyl amine, and a petroleum hydrocarbon diluent.

19. The process of claim 9 further wherein
in step 1, the sulfuric acid solution containing titanium ions and other metal ions is obtained by digesting one or more of titanium-iron ore, titanium-containing slag and titanium-containing industrial waste with sulfuric acid of high concentration; dissolving the digested product in a sulfate salt-containing solution; and cooling the sulfuric acid solution to remove iron ion in the solution as crystalline ferrous sulfate;
the aqueous liquid of step 2 may contain the stripping liquid from step 7; and recycling most of the raffinate of extraction for dissolving the digested product of the titanium-containing raw material with sulfuric acid; and
in step 5, a portion of the raffinate of step 1 containing metal ions other than titanium ion at economically recoverable concentrations is brought into contact with organic solvent B.

* * * * *